(12) United States Patent
Turcios et al.

(10) Patent No.: US 9,898,165 B1
(45) Date of Patent: Feb. 20, 2018

(54) TAXI ROUTE RECORDING METHODS ON AN AIRCRAFT DISPLAY UNIT

(71) Applicant: ROCKWELL COLLINS, INC., Cedar Rapids, IA (US)

(72) Inventors: Felix B. Turcios, Cedar Rapids, IA (US); Christopher A. Scherer, Cedar Rapids, IA (US); Travis S. VanderKamp, Cedar Rapids, IA (US); Sarah Barber, Cedar Rapids, IA (US); Kirschen A. Seah, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 105 days.

(21) Appl. No.: 13/889,395

(22) Filed: May 8, 2013

(51) Int. Cl.
*G06F 3/0484* (2013.01)

(52) U.S. Cl.
CPC .................. *G06F 3/0484* (2013.01)

(58) Field of Classification Search
CPC ........ G01C 21/00; G01C 21/36; G01C 23/00; G01C 23/005; G08G 5/0043; G08G 5/0047
USPC ...................... 701/3, 528, 538; 715/705, 771
See application file for complete search history.

(56) References Cited

U.S. PATENT DOCUMENTS

| | | |
|---|---|---|
| 8,396,616 B1 | 3/2013 | Barber et al. |
| 2001/0040554 A1* | 11/2001 | Nakagawa ................... 345/160 |
| 2004/0006412 A1* | 1/2004 | Doose et al. .................. 701/10 |
| 2011/0196599 A1* | 8/2011 | Feyereisen et al. .......... 701/120 |

* cited by examiner

*Primary Examiner* — Andrey Belousov
*Assistant Examiner* — Seth A Silverman
(74) *Attorney, Agent, or Firm* — Daniel M. Barbieri; Donna P. Suchy; Angel N. Gerdzhikov

(57) ABSTRACT

Present novel and non-trivial methods for electronically recording a taxi route on a display unit are disclosed. In one method, a tax route entry window ("TREW") such as a taxi clearance entry window is used to present in smaller windows surfaces and next intersecting surfaces from which a pilot sequentially selects surfaces based upon surfaces stated in a taxi clearance. In another method, the TREW is comprised of an airport-specific keyboard or a traditional keyboard with visually-variable, interactive buttons, where an activation or deactivation of each button is dependent upon surfaces specified in the taxi clearance and potential intersecting surface. In another method, selections are made on the TREW and surfaces corresponding to the selections are highlighted in an image presenting a map of surfaces. Additionally, the image presenting a map of surfaces may be panned and zoom to the size of the highlighted surface.

25 Claims, 18 Drawing Sheets

TAXI ROUTE RECORDING METHODS ON AN AIRCRAFT DISPLAY UNIT

BACKGROUND OF THE INVENTION

Field of the Invention

This invention pertains generally to the field of aircraft display units that present information to the pilot or flight crew of an aircraft on the surface of an airport.

Description of the Related Art

With a desire to reduce aircraft weight and with the proliferation of portable, lightweight electronic devices (e.g., notebooks, flight bags, and tablets), paper documents (e.g., checklists, charts, amps, etc. . . . ) are being used less by pilots of aircraft. With respect to maps, electronic moving maps such as an airport surface moving map ("ASMM") are becoming ubiquitous throughout the aviation industry. Examples of aircraft providing ASMMs include the Boeing 787, the Airbus 380, and many business and regional jets. These maps are intended to increase surface situational awareness by displaying the airport map with ownship position and/or surface traffic overlay of other traffic.

Taxi clearances contain taxi instructions to pilots, and they are often provided via two-way radio communications between a pilot and a person authorized to issue the taxi clearance (e.g., an air traffic/ground controller). Taxi clearances may be communicated to the pilot using VHF radio. The pilot will hear the taxi clearance and record it as it is being heard. As the pilot hears the clearance, he or she may record or transcribe the clearance by writing it down on a piece of paper, notating the route on a paper chart, etc. . . . . If the clearance is written down, the pilot may have to constantly shift his or her attention between the words of the clearance and a map of an airport to understand the route stated in the clearance. If the pilot records the clearance on a paper chart, mistakes made in the initial transcription may result in the erasing or crossing out of erroneous entries, which could confuse the pilot when he or she makes subsequent reference to it during the taxi.

BRIEF SUMMARY OF THE INVENTION

The embodiments disclosed herein present at least novel and non-trivial methods for electronically recording a taxi clearance on an airport surface map that is presented on a display unit. The disclosed electronic recording methods may ease the pilot's ability to receive and record the taxi clearance.

In one embodiment, a first method is disclosed for electronically recording a taxi clearance on a display unit, where such method may be performed by a taxi path generator ("TPG"). Initially, pixel image data representative of an airport surface map may be established and displayed on a display unit such as portable, touch screen device. After the map is displayed, the TPG may receive first entry data corresponding to a destination surface (e.g. an assigned runway for takeoff) from a pilot input device (which could also be the same device as the display unit, a physical keyboard installed in the aircraft, etc. . . . ). In response, the pixel image data could be updated with first pixel data representative of one or more prospective originating surfaces and one or more intersecting surfaces appearing within a taxi clearance entry window ("TCEW"). Additionally, the TPG may receive second entry data corresponding to an entry of one intersecting surface appearing within the TCEW and update pixel image data with second pixel data representative of an additional surface specified in the taxi clearance and one or more additional intersecting surface appearing within the taxi clearance entry window.

In another embodiment, a second method is disclosed for electronically recording a taxi clearance on the display unit. After pixel image data representative of a map of airport surfaces has been established and displayed on the display unit, the TPG may receive first entry data through the pilot input device corresponding to a destination surface. Where the TCEW is comprised of an airport-specific keyboard or a traditional keyboard, the pixel image data could be updated with first pixel data representative of first activated and deactivate keys. Additionally, the TPG may receive second entry data corresponding to an entry of one intersecting surface and update pixel image data with second pixel data representative of second activated and deactivate keys.

In another embodiment, a third method is disclosed for electronically recording a taxi clearance on the display unit. After both first pixel image data representative of a map of airport surfaces and second pixel image data representative of a TCEW have been established and displayed on the display unit, the TPG may receive first entry data corresponding to a destination surface. In response, the first pixel image data and second pixel image data may be updated with first pixel data and second pixel data, respectively, representative of a first highlighter corresponding to the destination surface and an updated TCEW, respectively. Additionally, the TPG may receive second entry data corresponding to one or more entries of intersecting surface(s) and update the first pixel image data and second pixel image data accordingly with third pixel data and fourth pixel data, respectively, representative of one or more second highlighters and one or more updated TCEWs, respectively.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
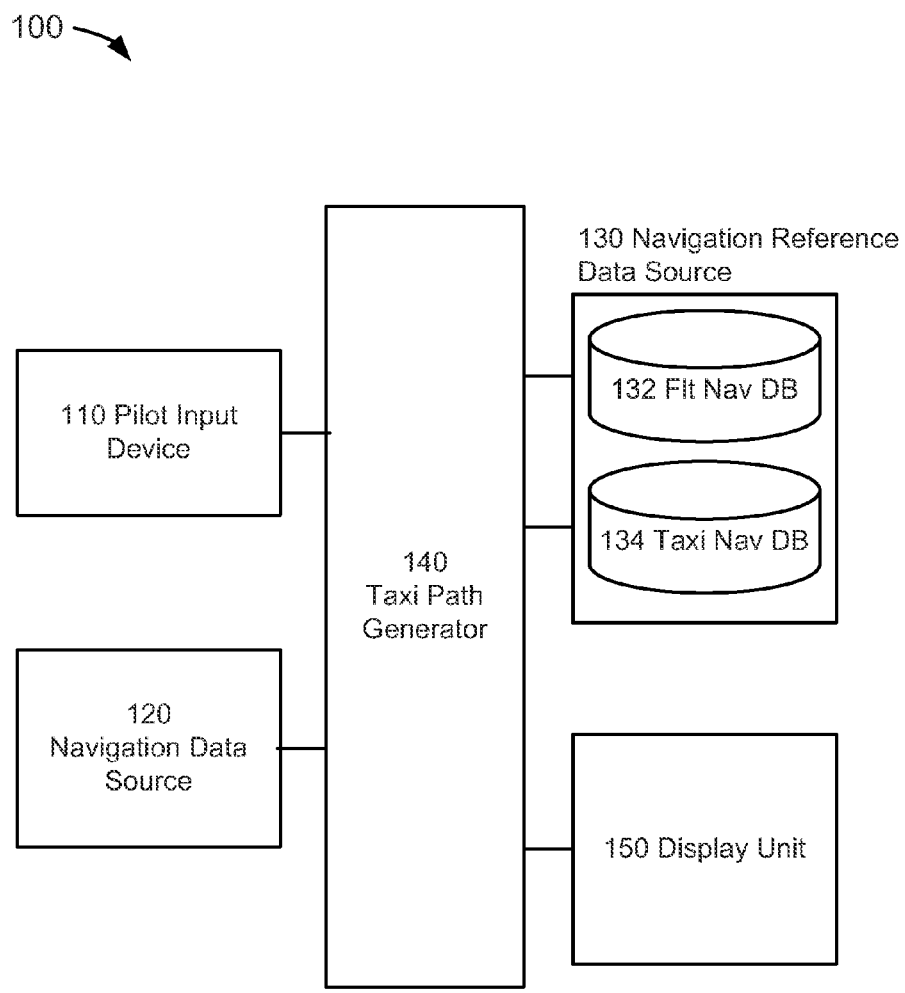
FIG. 1 depicts a block diagram of an electronic taxi clearance recording system.

FIG. 1 depicts a block diagram of an electronic taxi clearance recording system 100 suitable for implementation of the techniques described herein. The electronic taxi clearance recording system 100 of an embodiment of FIG. 1 includes a pilot input device 110, a navigation data source 120, a navigation reference data source 130, a taxi path generator ("TPG") 140, and a display unit 150.

In an embodiment of FIG. 1, the pilot input device 110 could be comprised of any source for facilitating a pilot's interaction with graphical user interfaces ("GUI") referred to as interactive widgets that are displayed on the surface of a local display unit 150 (some non-interactive widgets could also be displayed). The pilot input device 110 may include any device that allows for the manual selection of a widget and/or entry of data. Furthermore, the pilot input device 110 may include any device which allows a pilot to enter any data received by the TPG 140 such as one or more surfaces created, developed, designed, and/or designated by the pilot. Such devices could include, but are not limited to, a tactile device (e.g., a physical keyboard with tactile buttons, control display unit, cursor control device, stylus, electronic grease pen, handheld device, touch screen device, notebook, tablet, electronic flight bag, etc. . . . ) and/or speech recognition systems. The pilot input device 110 could be integrated with the display unit 150 if it is configured to receive pilot input (e.g., handheld device, touch screen device, notebook, tablet, etc. . . . ). It should be noted that, although the discussion herein is drawn to the term "pilot," the definition of such term should not be limited to flight personnel but should include ground personnel and/or any other person who may not possess a license to fly. As embodied herein, the pilot input device 110 may provide input representative of a pilot's selection to a TPG 140.

In an embodiment of FIG. 1, the navigation data source 120 could be comprised of any system or systems that could provide navigation data information in an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

The navigation data source 120 may include, but is not limited to, an air/data system, an attitude heading reference system, an inertial guidance system (or inertial reference system), a radio navigation system, and a global navigation satellite system (or satellite navigation system), all of which are known to those skilled in the art. As embodied herein, the navigation data source 120 could provide navigation data including, but not limited to, ownship position. As embodied herein, the pilot input device 110 (e.g., handheld device, notebook, tablet, etc. . . . ) could be integrated with the navigation data source 120 (e.g., global navigation satellite system) to receive position information and/or configured to receive position information through a wired data bus and/or wireless network from the navigation data source 120 installed in an aircraft. As embodied herein, navigation data may be provided to the TPG 140 for subsequent processing as discussed herein.

In an embodiment of FIG. 1, the navigation reference data source 130 could be comprised of any source of airport surface data including, but is not limited to, a flight navigation database 132, a taxi navigation database 134, and/or other aircraft systems.

The flight navigation database 132 may contain records which provide runway data. The flight navigation database 132 could contain navigation reference data representative of information associated with, but not limited to, airport and airport surfaces including runways and taxiways. As embodied herein, the FMS could employ the flight navigation database 132.

The taxi navigation database 134, such as one described by Krenz et al in U.S. Pat. No. 7,974,773, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 134 could comprise an aerodrome mapping database ("AMDB") as described in the following document published by RTCA, Incorporated: RTCA DO-272A entitled "User Requirements for Aerodrome Mapping Information." RTCA DO-272A provides for aerodrome surface mapping requirements for aeronautical uses particularly on-board aircraft. It should be noted that any standards are subject to change. Those skilled in the art appreciate that standards in the aviation industry including, but not limited to, RTCA DO-272A may be subject to change with future amendments or revisions and/or that other standards related to the subject matter may be adopted. The embodiments disclosed herein are flexible enough to include such future changes and/or adoptions of aviation standards. As embodied herein, the navigation reference data source 130 could provide runway data to the TPG 140 for subsequent processing as discussed herein.

In an embodiment of FIG. 1, the TPG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The TPG 140 may be driven by the execution of software or computer instruction code containing algorithms developed for the specific functions embodied herein. The TPG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the TPG 140 could be a processor(s) used by or in conjunction with any other system of the aircraft including, but not limited to, the pilot input device 110, the navigation data source 120, the navigation reference data source 130, and the display unit 150, or any combination thereof.

The TPG 140 may be programmed or configured to receive as input data representative of information obtained from various systems and/or sources including, but not limited to, the pilot input device 110, the navigation data source 120, and the navigation reference data source 130. As embodied herein, the terms "programmed" and "configured" are synonymous. The TPG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus or through a wireless network. The TPG 140 may be programmed or configured to execute one or both of the methods discussed in detail below. The TPG 140 may be programmed or configured to provide output data to various systems and/or units including, but not limited to, the display unit 150.

In an embodiment of FIG. 1, the display unit 150 could comprise any unit which presents symbolic information related to airport and non-airport surfaces. The display unit could be installed permanently in ownship and/or a portable device (e.g., handheld device, notebook, tablet, etc. . . . ). In one embodiment herein, the display unit 150 could be configured to display an airport surface moving map ("ASMM"). The ASMM may depict ownship position on an airport surface, where ownship may be considered the aircraft in which the display unit is installed. Ownship position may be determined from data provided by the navigation data source 120, and airport surfaces may be determined and/or formed from data provided by the navigation reference data source 130, where data retrieved from the navigation reference data source 130 may be retrieved automatically based upon the ownship position data. The amount of airport surface information displayed could depend upon a range selected by the pilot, where such range could depend on the amount of information with which he or she wants to be presented. As embodied herein, the ASMM may be used in conjunction with one or more aircraft systems such as an ADS-B system and a TIS-B system to enhance the situational awareness of other traffic on the ground by presenting the position of other traffic on the ASMM in relation to ownship. As stated above, the display unit 150 could be integrated with the pilot input device 110 that is configured to receive pilot input (e.g., handheld device, touch screen device, notebook, tablet, etc. . . . ).

Figure 2:
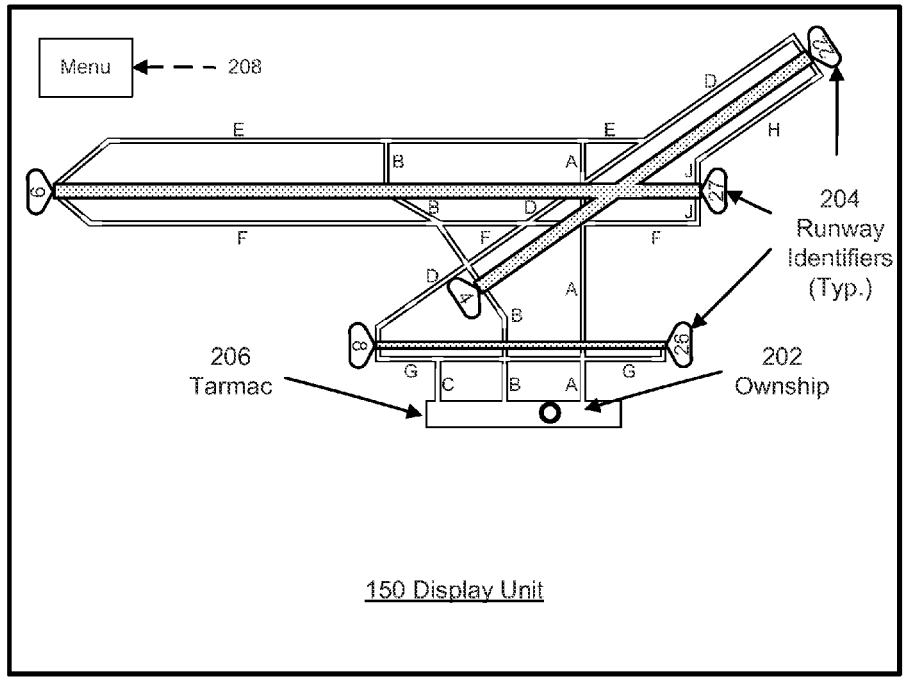
FIG. 2 depicts an exemplary illustration of an Airport Surface Moving Map ("ASMM") presented on a display unit.

Referring to FIG. 2, an exemplary illustration of an ASMM is presented on the display unit 150. FIG. 2 depicts the position of ownship 202 in relation to taxiways and runways, where the runways have been identified by directional runway identifiers 204 as the following: RWY 4/22, RWY 9/27, and RWY 8/26. The directional runway identifiers 204 could be employed to identify each runway. As embodied herein, data representative of such directional runway identifiers 204 could be provided by the navigation reference data source 130. As depicted in FIG. 2, each directional runway identifier may be comprised of a closed shape containing runway identifier information. The closed shape may comprise an oval in which one of the long sides has been replaced with a pointer, where the direction of such pointer indicates the direction of the runway corresponding to the closed shape. Directional runway identifiers have been disclosed by Barber et al in U.S. Pat. No. 8,396,616 dated Mar. 12, 2013 and entitled "System, Module, and Method for Presenting Surface Symbology on an Aircraft Display Unit" (collectively, "Barber"), which is incorporated by reference in its entirety.

For the purpose of illustration and not limitation, ownship 202 symbology is depicted as a circle in FIG. 2; those skilled in the art know that the symbology for depicting ownship 202 may be configurable by a manufacturer and/or end-user. From the information depicted in FIG. 2, ownship 202 is located on tarmac 206. Also, the pilot has tapped "MENU" (item 208) from which he or she may access the "TAXI ROUTE" page. For the purpose of illustration in the discussion that follows, tapping will be indicated as a dashed line as shown in FIG. 2.

Figure 3A:
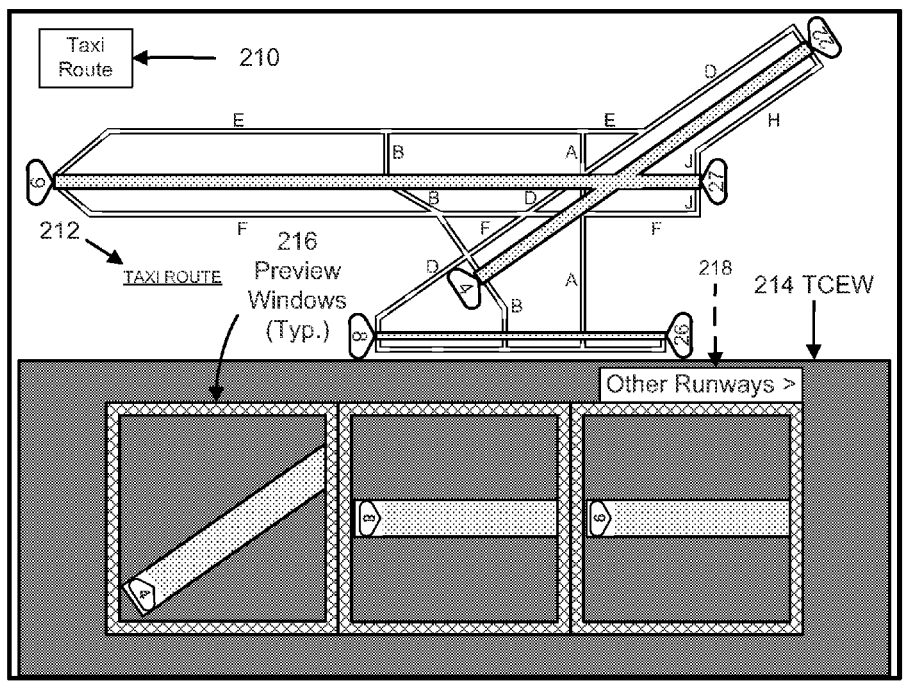
FIG. 3A illustrates a first taxi clearance entry window ("TCEW") presented on an ASMM.

The advantages and benefits of the embodiments discussed herein may be illustrated in FIG. 3A-3I by demonstrating a method by which a taxi clearance may be recorded electronically through, as shown in FIG. 3A, a taxi clearance entry window ("TCEW") 214 presented on or against a "TAXI ROUTE" page (item 210) of the ASMM through a series of surface selections (e.g., taps). The TCEW 214 may be comprised of one or more preview windows 216, each containing a graphical image of one or more airport surfaces; as illustrated in FIG. 3A, graphical images of runways 4, 8, and 9 are shown. The use of the TCEW 214 could provide an additional and/or alternative method to the methods for the electronic recording of taxi clearances disclosed by Shapiro et al in U.S. Pat. No. 9,202,380 entitled "System and Method for Electronically Recording a Taxi Clearance of an Aircraft Display Unit" (collectively, "Shapiro"), which is incorporated by reference in its entirety. Moreover, more than one of the electronic recording methods disclosed herein or by Shapiro may be interchangeably swapped with one another as the taxi clearance is being received and/or recorded.

The taxi clearance may be presented graphically and/or textually under taxi route 212 on the ASMM simultaneously as the taxi clearance is being recorded through the TCEW 214 or after the recording of the clearance is completed; the textual presentation could aid the pilot during a read-back of the clearance. The locations of the menu 208, the taxi route 212, and the TCEW 214 are configurable and not limited to the areas as depicted. For the following exemplary disclosures of the embodiments of FIGS. 3A-3I, ownship 202 is ready to taxi for take-off from the tarmac 206 and will receive the following taxi clearance: "Runway 22, taxi via Alpha, Foxtrot, Juliet, Hotel, cross Runway 26, hold short of Runway 27."

When "Runway 22" is provided to begin the clearance, the pilot may select this runway by tapping on the preview window 216 for Runway 22. Because Runway 22 is not a surface currently depicted in one of the preview windows 216, the pilot may access other surfaces by tapping on the "Other Runway" interactive button (item 218) shown in FIG. 3A. It should be noted that, although the following discussion will be drawn to selections made through finger tapping, other finger gestures and/or speech recognition systems could be used to select the runway and taxiway(s) specified in the taxi clearance; an example of other finger gestures could include a single finger gesture that traces along the runway and/or taxiway that could result with such surface(s) being selected. The embodiments disclosed herein are provided for the purpose of illustration and not limitation.

Figure 3B:
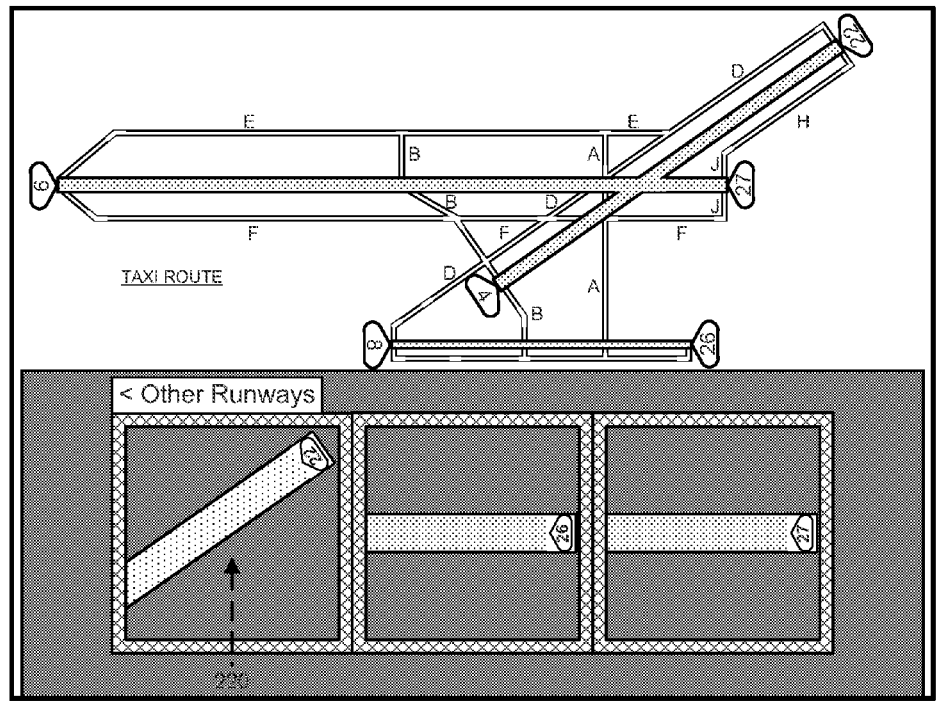
FIG. 3B illustrates a pilot's selection on a preview window.

As shown in FIG. 3B, the pilot has selected Runway 22 by tapping on the preview window corresponding to the runway (item 220). After the pilot has selected a runway, a second TCEW may be presented as shown in FIG. 3C.

Figure 3C:
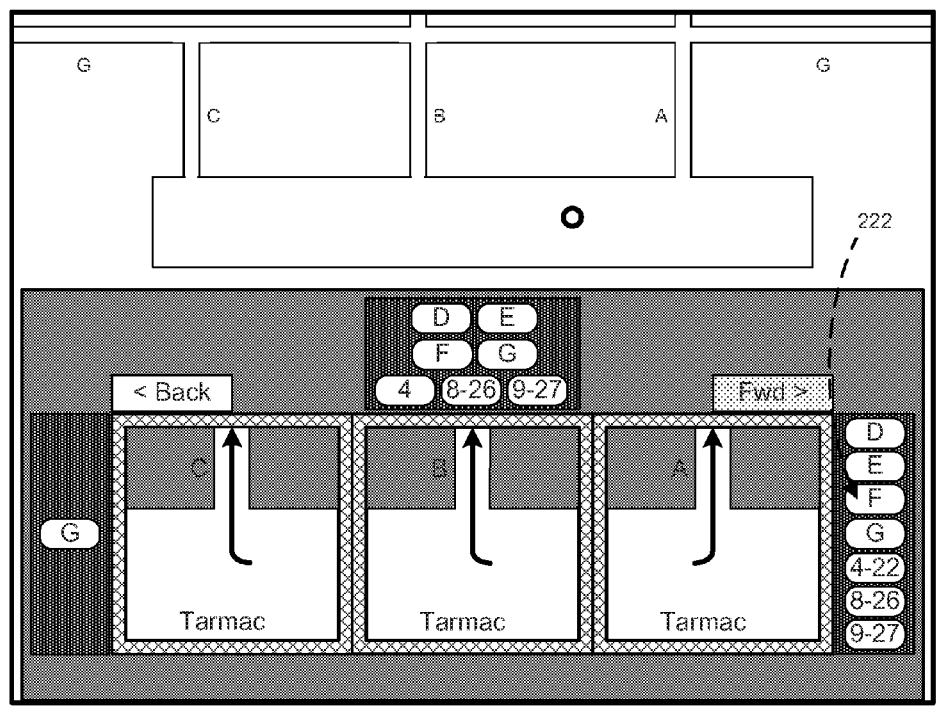
FIG. 3C illustrates a second TCEW responsive to a pilot's selection.

The TCEW of FIG. 3C may be comprised of one or more preview windows, each containing a graphical image of one or more airport surfaces based upon the location of ownship; as illustrated in FIG. 3C, graphical images of taxiways A, B, and C are shown because ownship is located on the tarmac where three taxiways intersect. Because the originating taxiway will be one of these three taxiways, three preview windows are presented in the TCEW: the right preview window depicts the intersection of the tarmac and Taxiway A along with arrow pointing in the direction of an aircraft exiting the tarmac on Taxiway A, the center preview window depicts the intersection of the tarmac and Taxiway B along with arrow pointing in the direction of an aircraft exiting on Taxiway B, and the left preview window depicts the intersection of the tarmac and Taxiway C along with an arrow pointing in the direction of an aircraft exiting on Taxiway C.

Adjacent to each preview window is at least one intersecting surface(s) window for the preview window, where each intersecting surface(s) window provides one or more interactive buttons containing the alphanumeric characters identifying one or more of surfaces located in the direction of travel and intersecting the surface shown in the preview window. The intersecting surface(s) window for Taxiway A is located to the right of the surface's preview window; likewise, the intersecting surface(s) window for Taxiways B and C are located above and to the left of their respective surfaces.

As an aircraft exits the tarmac, the following surfaces intersect Taxiway A (in the order of the direction of travel): Taxiway G, Runway 8-26, Taxiway F, Runway 4-22, Runway 9-27, Taxiway D, and Taxiway E. As shown in the intersecting surface(s) window for Taxiway A, there is an interactive button for each of these surfaces. For Taxiway B, the following are intersecting surfaces: Taxiway G, Runway 8-26, Runway 4, Taxiway D, Taxiway F, Runway 9-27, and Taxiway E. As shown in the intersecting surface(s) window for Taxiway B, there is an interactive button for each of these surfaces. For Taxiway C, there is one intersecting surface only: Taxiway G. As such, there is only one interactive button shown in the intersecting surface(s) window for Taxiway C.

The pilot's selection of Runway 22 may trigger a panning and auto-zooming of the ASMM so the pilot's attention is drawn to each prospective originating taxiway as shown in FIG. 3C. As embodied herein, these functions can be performed as a function of the size of the prospective originating taxiway(s) using techniques known to those skilled in the art.

As the clearance continues and "Alpha" has been provided in sequence, the pilot's attention may be drawn to the preview window of Taxiway A; however, because this is the originating taxiway of the taxi clearance, he or she does not need to make a selection until one of the seven intersecting surfaces has been specified in the taxi clearance.

As the clearance continues and "Foxtrot" has been provided in sequence, the pilot may select this taxiway by tapping on, for example, the interactive F button (item 222) as shown in FIG. 3C. After the pilot has selected this button, a third TCEW may be presented as shown in FIG. 3D.

Figure 3D:
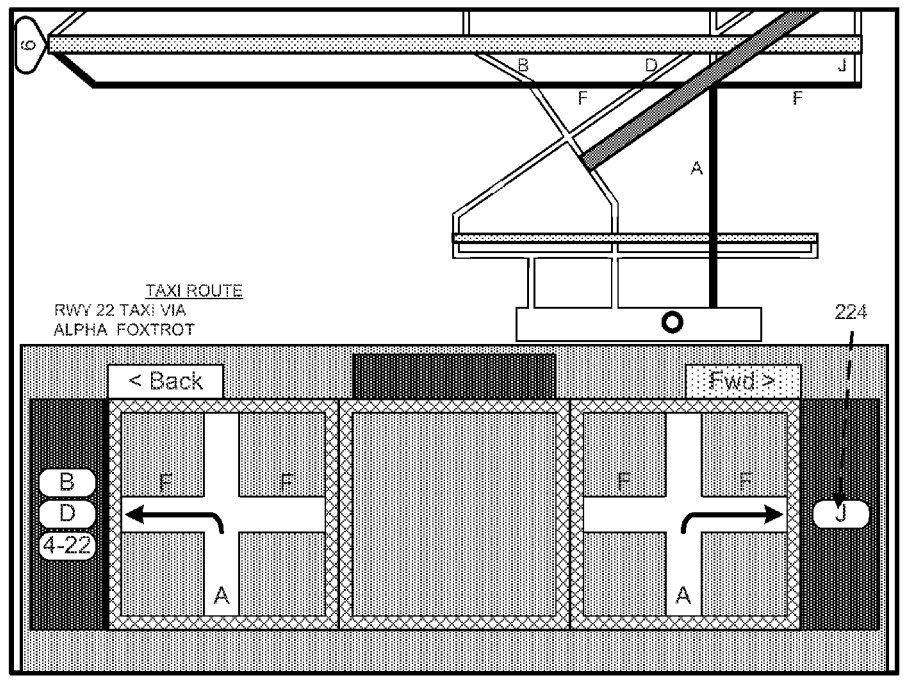
FIG. 3D illustrates a third TCEW responsive to a pilot's selection.

The TCEW of FIG. 3D may be comprised of one or more preview windows, each containing a graphical image of an intersection of airport surfaces based upon the current and previous taxiways stated in the clearance; as illustrated in FIG. 3D, two graphical images of Taxiways A and F are shown. Because there are two directions to which an aircraft can turn onto Taxiway F, two preview windows are presented with graphical images in the TCEW: the right preview window depicts the intersection and an arrow pointing in the direction of a right turn onto Taxiway F, and the left preview window depicts the intersection and an arrow pointing in the direction of a left turn onto Taxiway F. Adjacent to each preview window is its corresponding intersecting surface(s) window. It should be noted that, although a total of three preview windows are shown, a manufacturer and/or end-user may configure the TCEW for presenting two preview windows only in instances where there are only two possible directions to proceed.

For an aircraft turning left onto Taxiway F from Taxiway A, the following surfaces intersect Taxiway F: Runway 4-22, Taxiway D, and Taxiway B. As shown in the intersecting surface(s) window, there is an interactive button for each of these surfaces. For an aircraft turning right onto Taxiway F from Taxiway A, there is one intersecting surface only: Taxiway J. As such, there is only one interactive button as shown in the intersecting surface(s) window.

The pilot's selection of the interactive F button may be indicated on the ASMM with graphical and/or textual changes. As shown in FIG. 3D, Taxiways A and F have been highlighted. In addition, the ASMM has been panned and automatically zoomed as a function of the size of Taxiway F.

As the clearance continues and "Juliet" has been provided in sequence, the pilot may select this taxiway by tapping on, for example, the interactive J button (item 224) as shown in FIG. 3D. After the pilot has selected this button, a fourth TCEW may be presented as shown in FIG. 3E.

Figure 3E:
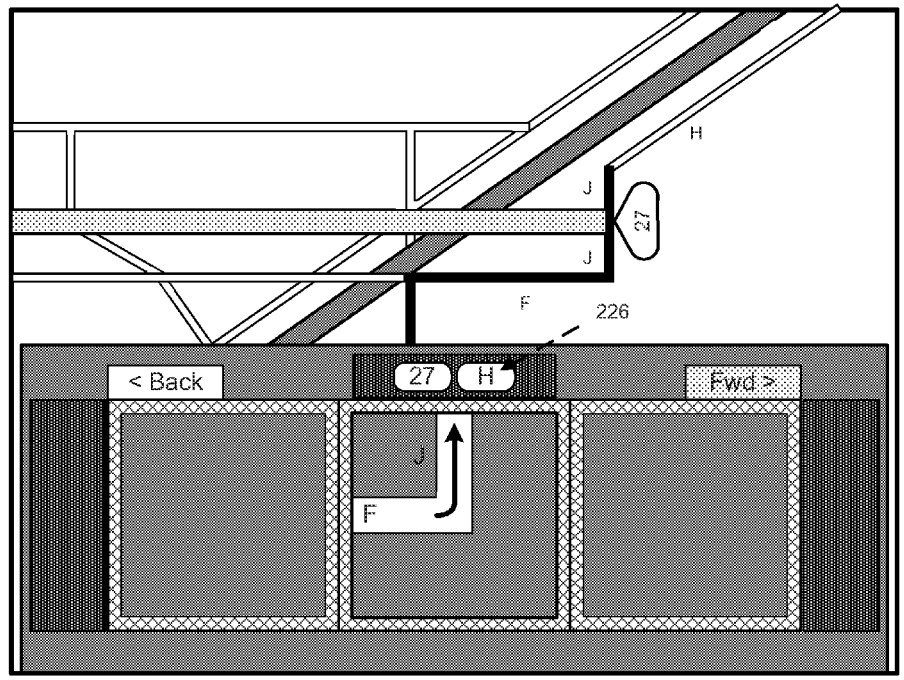
FIG. 3E illustrates a fourth TCEW responsive to a pilot's selection.

The TCEW of FIG. 3E may be comprised of one preview window containing a graphical image of an intersection of airport surfaces based upon the current and previous taxiways stated in the clearance; as illustrated in FIG. 3E, one graphical image of Taxiways F and J is shown. Because there is only one direction to which an aircraft can turn onto Taxiway J, one preview window is presented in the TCEW. Adjacent to the preview window is its corresponding intersecting surface(s) window. It should be noted that, although a total of three preview windows are shown, a manufacturer and/or end-user may configure the TCEW for presenting one preview window only in instances where there is only one possible direction to proceed.

For an aircraft turning left onto Taxiway J from Taxiway F, the following surfaces intersect Taxiway J: Runway 27 and Taxiway H. As shown in the intersecting surface(s) window, there is an interactive button for each of these surfaces.

The pilot's selection of the interactive J button may be indicated on the ASMM with graphical and/or textual changes. As shown in FIG. 3E, Taxiway J has been highlighted. In addition, the ASMM has been panned and automatically zoomed as a function of the size of Taxiway F. Also, the panning and auto-zooming function has included substantial portion of intersecting surface H where the size of the taxiway is relatively small.

As the clearance continues and "Hotel" has been provided in sequence, the pilot may select this taxiway by tapping on, for example, the interactive H button (item 226) as shown in FIG. 3E. After the pilot has selected this button, a fifth TCEW may be presented as shown in FIG. 3F.

Figure 3F:
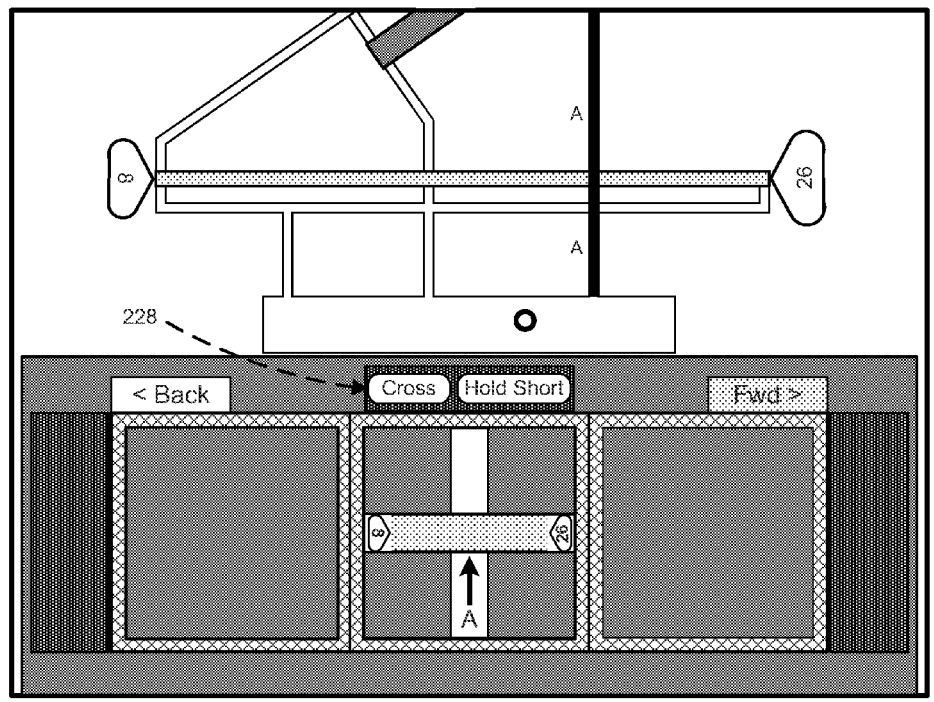
FIG. 3F illustrates a fifth TCEW responsive to a pilot's selection.

The TCEW of FIG. 3F may be comprised of "Cross/Hold Short" preview window containing a graphical image of an intersection between a stated taxiway and a runway other than the assigned departure runway; as illustrated in FIG. 3F, one graphical image of the intersection of Taxiway A and Runway 8-26 is shown. Adjacent to the preview window is its corresponding intersecting surface(s) window within which "Cross" and "Hold Short" interactive buttons are shown. It should be noted that, although a total of three preview windows are shown, a manufacturer and/or end-user may configure the TCEW for presenting one preview window only in instances where a cross or hold short instruction is anticipated.

The appearance of a "Cross/Hold Short" preview window could have been triggered where a taxiway intersects with the destination surface, where this taxiway may be considered the final taxiway stated in the taxi clearance; that is, "Cross/Hold Short" preview window appears because the terminating end of Taxiway H intersects the departure end of Runway 22.

The pilot's selection of the interactive H button may be indicated on the ASMM with graphical and/or textual changes. Looking ahead to FIGS. 3H and 3I, Taxiway H has been highlighted.

As the clearance continues and "cross Runway 26" has been provided in sequence, the pilot may tap the interactive Cross button as shown in FIG. 3F (item 228). After the pilot has selected this button, a sixth TCEW may be presented as shown in FIG. 3G.

Figure 3G:
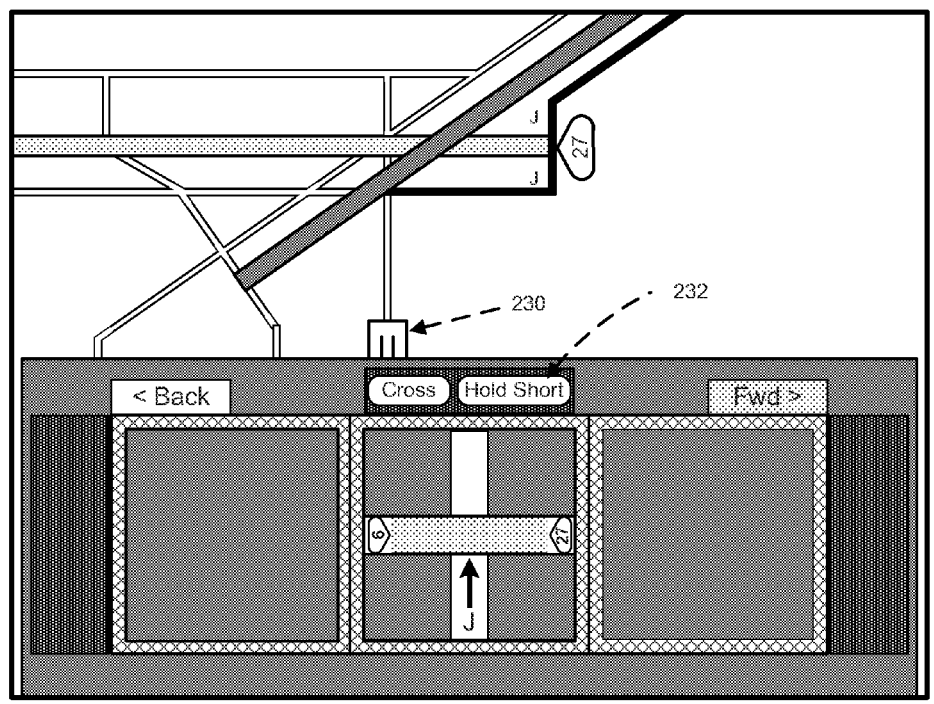
FIG. 3G illustrates a sixth TCEW responsive to a pilot's selection.

The TCEW of FIG. 3G may be comprised of a second "Cross/Hold Short" preview window containing a graphical image of the intersection of Taxiway J and Runway 9-27 is shown. Adjacent to the preview window is its corresponding intersecting surface(s) window within which "Cross" and "Hold Short" interactive buttons are shown. The appearance of the second "Cross/Hold Short" preview window may have been triggered because there is a second instance of an intersection between a taxiway stated in the taxi clearance and a runway. As shown in FIG. 3G, a cross symbol (item 232) has been added to the intersection of Taxiway A and Runway 26 as a result of the pilot's tapping of the interactive Cross button of FIG. 3F.

As the clearance continues and "hold short of Runway 27" has been provided in sequence, the pilot may tap the interactive Hold Short button as shown in FIG. 3G (item 232). After the pilot has selected this button, a seventh TCEW may be presented as shown in FIG. 3H.

Figure 3H:
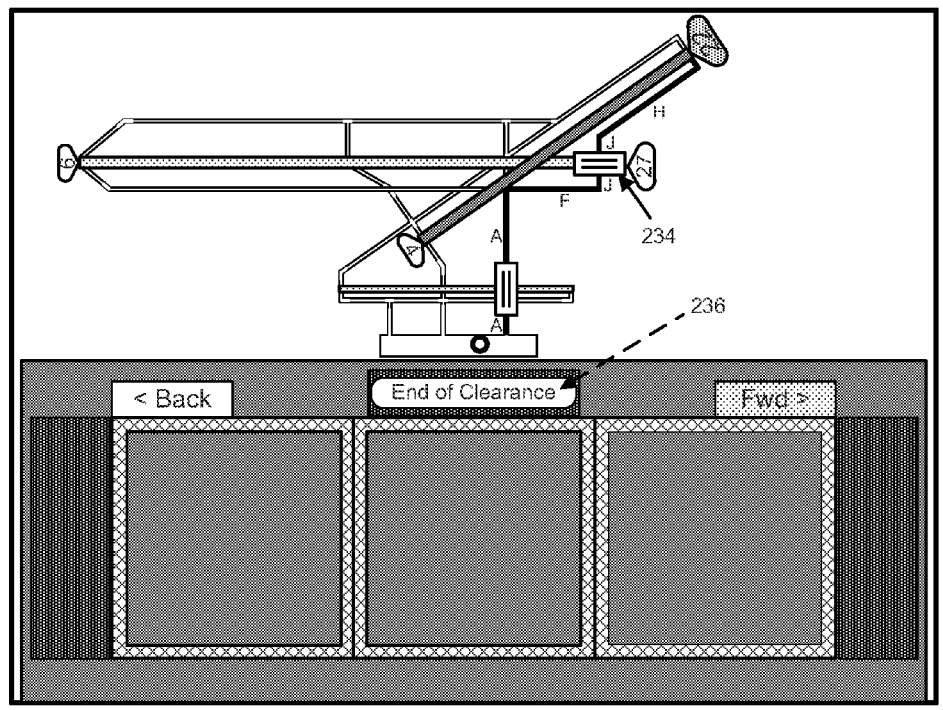
FIG. 3H illustrates a seventh TCEW responsive to a pilot's selection.

The TCEW of FIG. 3H may be comprised of preview windows which contain no graphical images. Adjacent to the center preview window is its corresponding intersecting surface(s) window within which an interactive "End of Clearance" button is shown. The appearance of this empty preview window may have been triggered because, for the taxi clearance that has been provided, there can be no other instance of an intersection between a taxiway stated in the taxi clearance and a runway. It should be noted that, although a total of three preview windows are shown, a manufacturer and/or end-user may configure the TCEW for presenting no preview window; instead, a menu or a plurality of interactive buttons known to those skilled in the art may be provided in the TCEW to guide the pilot through the acceptance of the taxi clearance or an inclusion of additional instructions stated in the taxi clearance.

The pilot's selection of the interactive End of Clearance button in intersecting surface(s) window of the center preview window may be indicated on the ASMM with graphical and/or textual changes. As shown in FIG. 3H, a hold short symbol (item 234) has been added to the intersection of Taxiway J and Runway 27. In addition, text corresponding to the cross selection could be included as "HOLD SHORT RWY 27" under the taxi route.

Figure 3I:
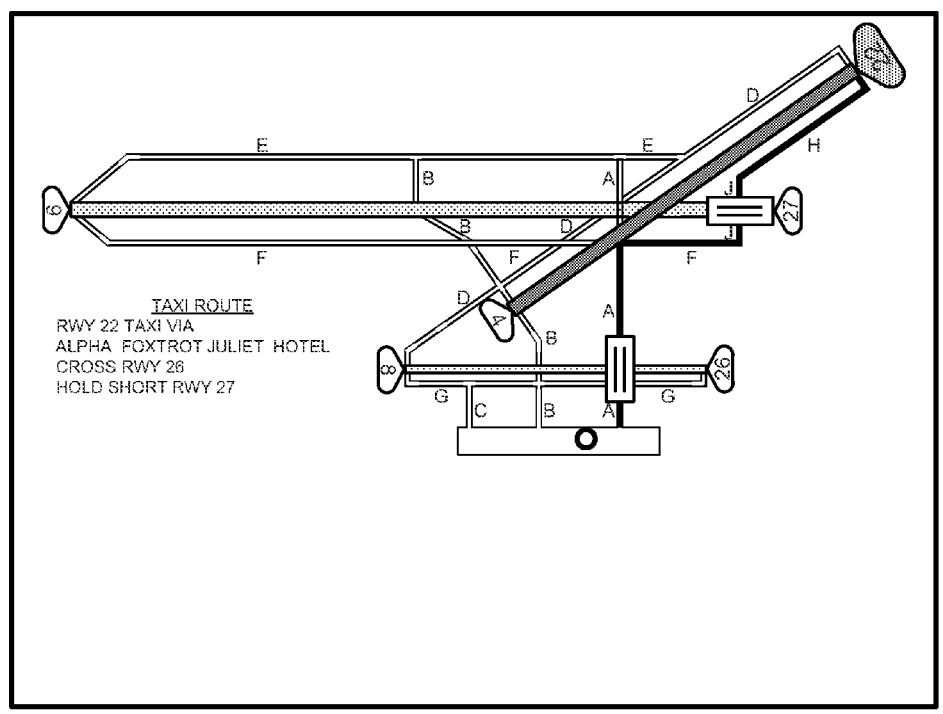
FIG. 3I illustrates an ASMM indicating cumulative graphical and/or textual changes made through the TCEW.

Because the end of the clearance has been reached, the pilot may tap the interactive End of Clearance button as shown in FIG. 3H (item 236). After the pilot has selected this button, the TCEW is removed from view as shown in FIG. 3I, leaving the ASMM indicative of the cumulative graphical and/or textual changes made through the sequence of selections discussed in the preceding paragraphs. As stated above, the textual presentation presented under the taxi route could aid the pilot during a read-back of the clearance.

Additionally, after the entry of the taxi clearance has been completed, a runway highlighter and/or taxi direction indicators could be presented as disclosed by Shapiro. As further disclosed by Shapiro, the runway highlighter could be made conspicuous or enhanced by color and/or intermittent flashing, where the configuration of such color and/or flashing could depend on the location of ownship in relation to the assigned runway.

Figure 4A:
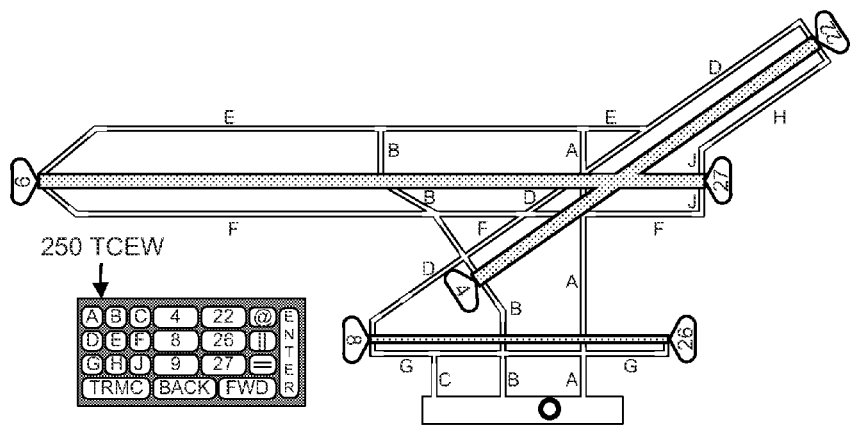
FIG. 4A illustrates a TCEW comprised of a keyboard.
Figure 4B:
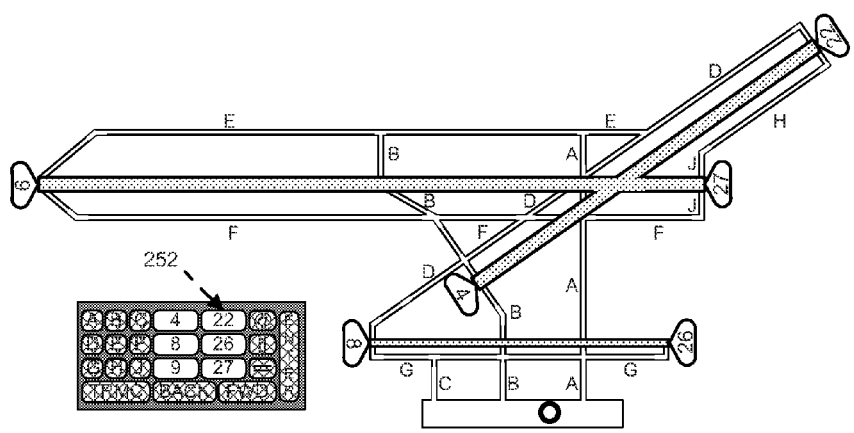
FIG. 4B illustrates the keyboard presented on an ASMM.
Figure 4C:
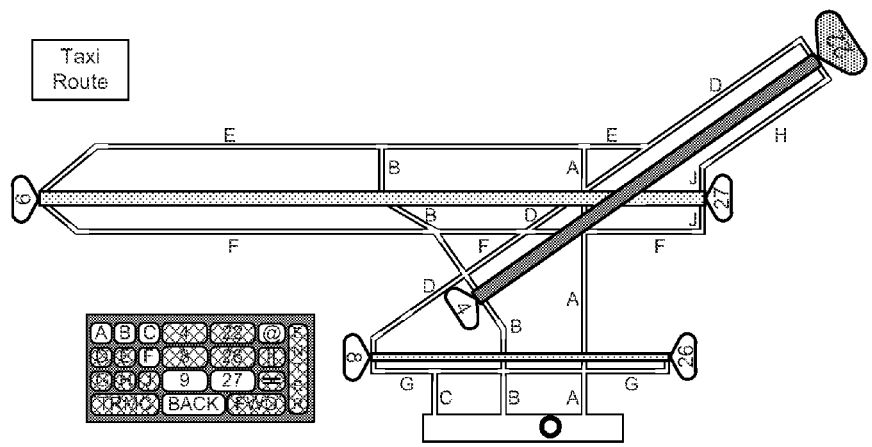
FIG. 4C illustrates visual appearances of activated and deactivated keyboard buttons.
Figure 4D:
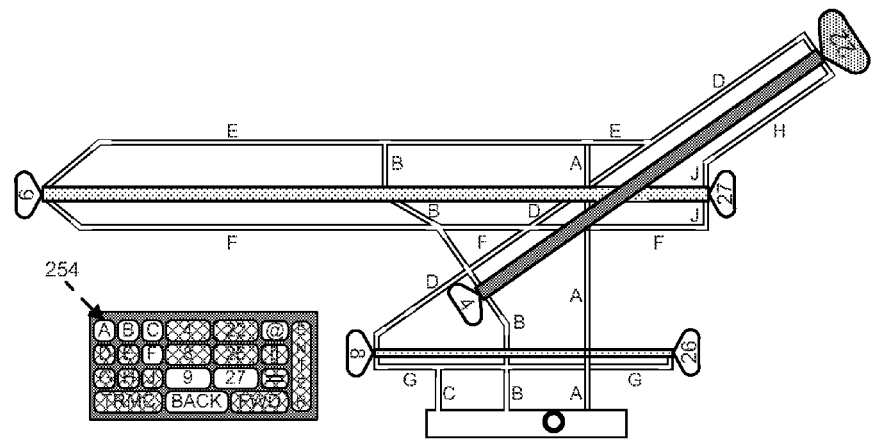
FIG. 4D illustrates a pilot's selection made on a keyboard.
Figure 4E:
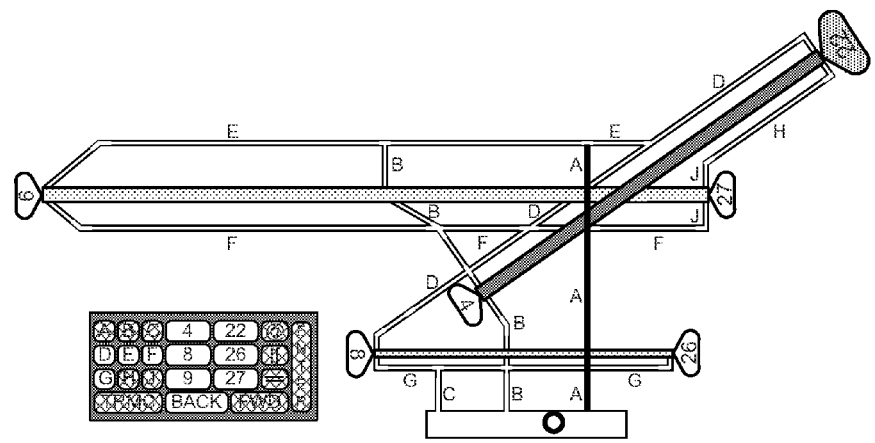
FIG. 4E illustrates second visual appearances of activated and deactivated keyboard buttons.
Figure 4F:
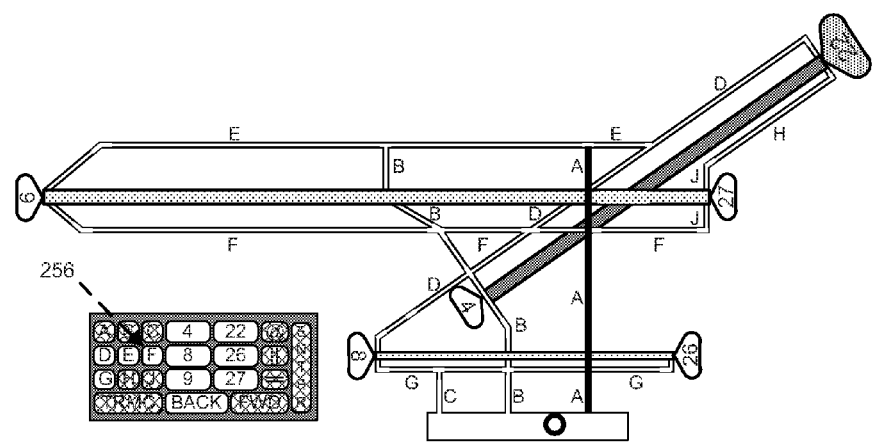
FIG. 4F illustrates a pilot's second selection made on a keyboard.
Figure 4G:
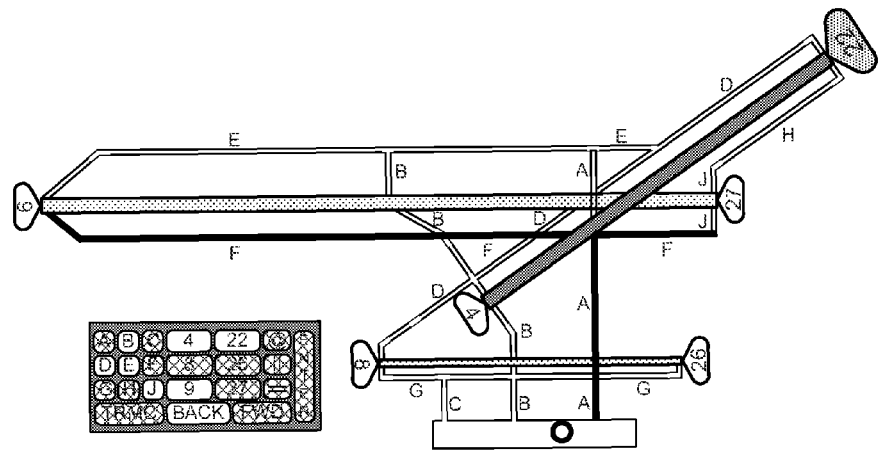
FIG. 4G illustrates third visual appearances of activated and deactivated keyboard buttons.
Figure 4H:
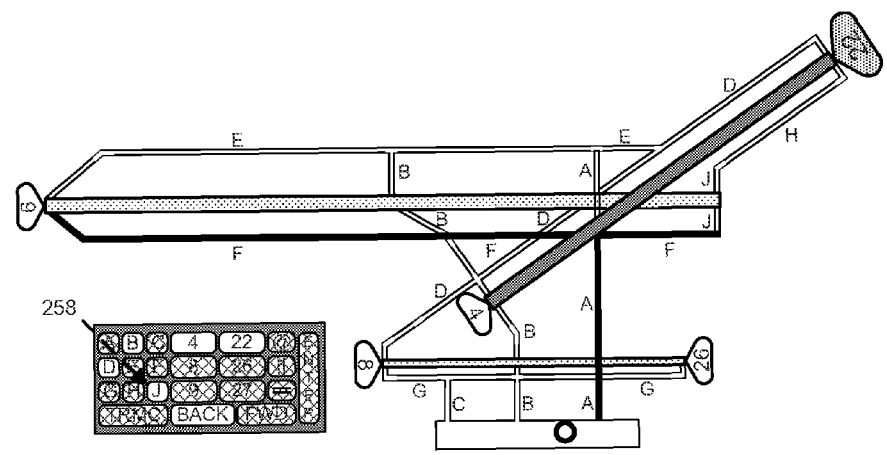
FIG. 4H illustrates a pilot's third selection made on a keyboard.
Figure 4I:
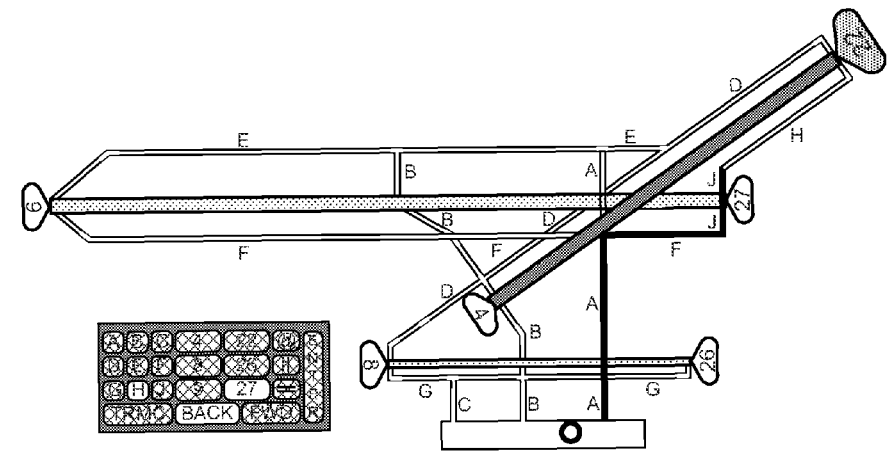
FIG. 4I illustrates fourth visual appearances of activated and deactivated keyboard buttons.
Figure 4J:
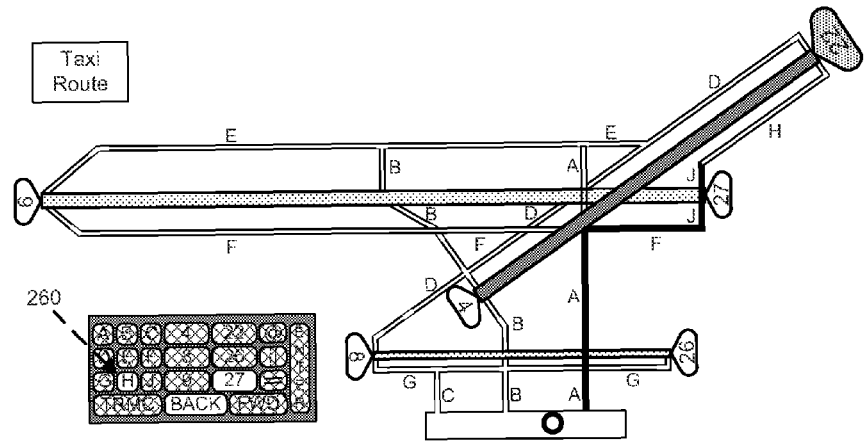
FIG. 4J illustrates a pilot's fourth selection made on a keyboard.
Figure 4K:
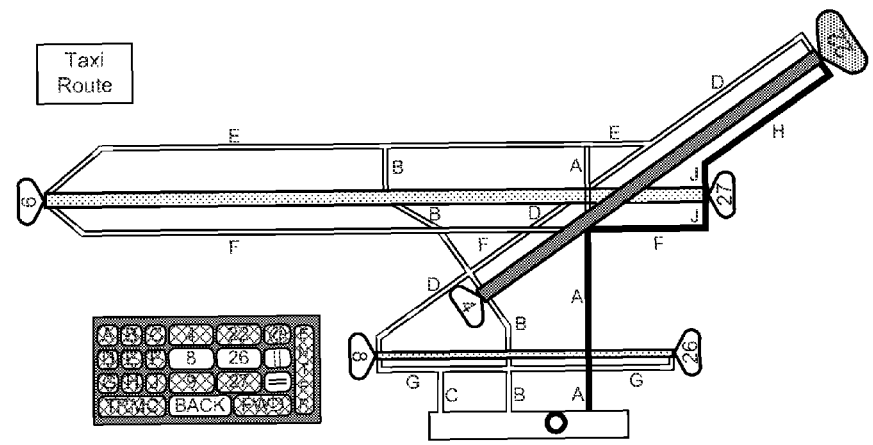
FIG. 4K illustrates fifth visual appearances of activated and deactivated keyboard buttons.
Figure 4L:
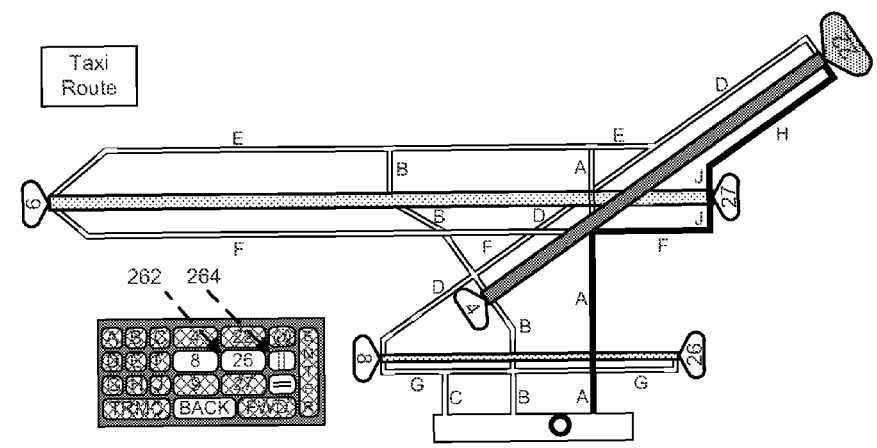
FIG. 4L illustrates a pilot's fifth selection made on a keyboard.
Figure 4M:
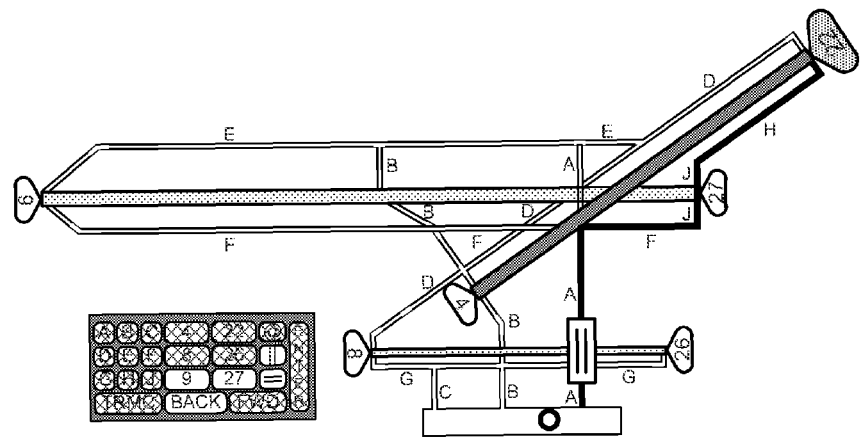
FIG. 4M illustrates sixth visual appearances of activated and deactivated keyboard buttons.
Figure 4N:
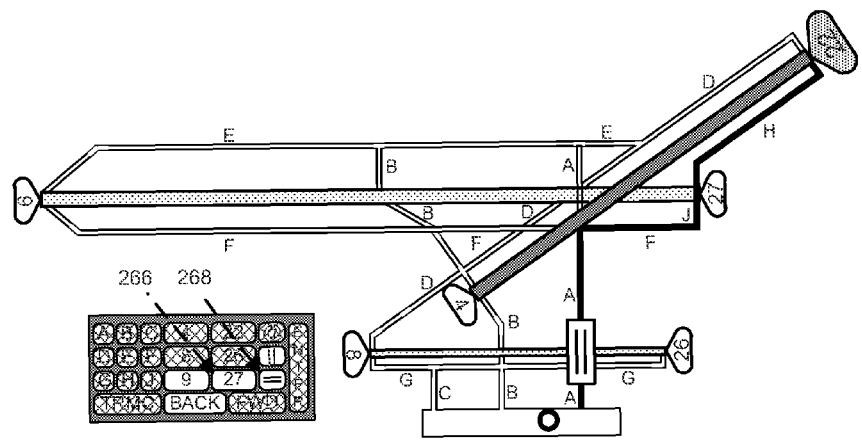
FIG. 4N illustrates a pilot's sixth selection made on a keyboard.
Figure 4O:
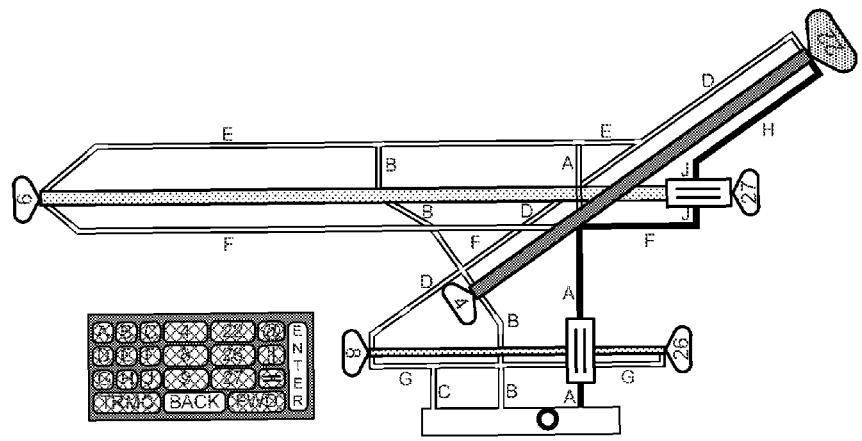
FIG. 4O illustrates seventh visual appearances of activated and deactivated keyboard buttons.
Figure 4P:
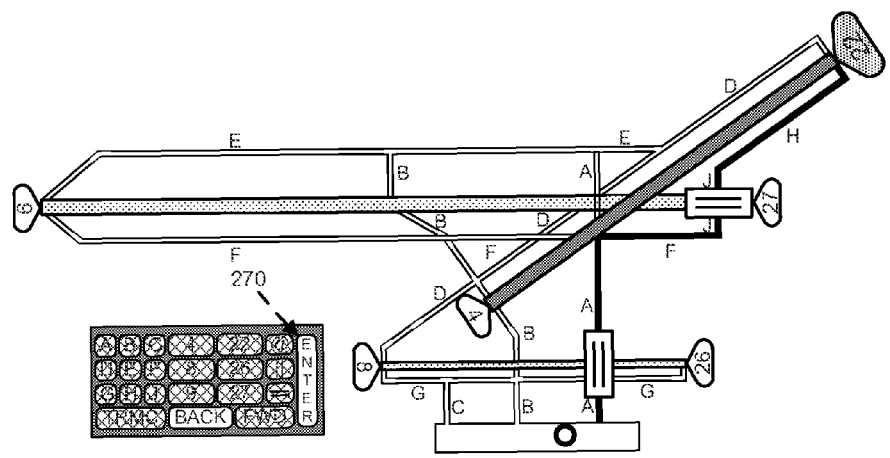
FIG. 4P illustrates a pilot's seventh selection made on a keyboard.
Figure 4Q:
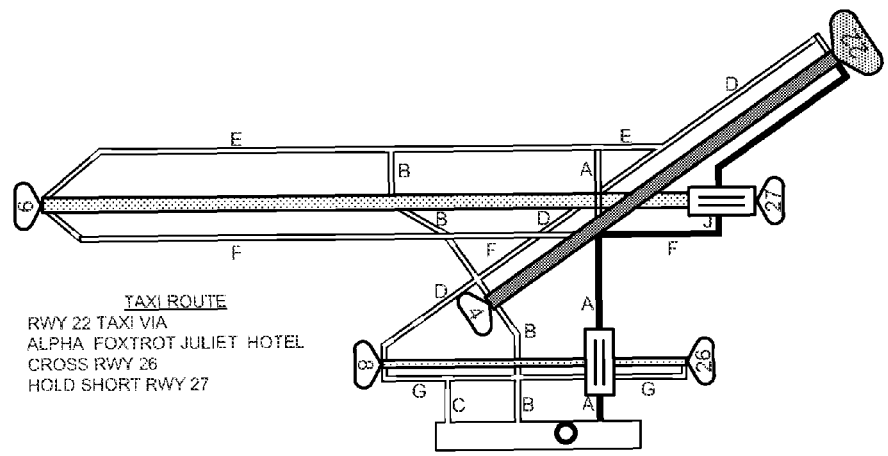
FIG. 4Q illustrates an ASMM indicating cumulative graphical and/or textual changes made through the keyboard.

Additional advantages and benefits of the embodiments discussed herein may be illustrated in FIG. 4A-4Q by demonstrating a method by which a taxi clearance may be recorded electronically through, as shown in FIG. 4A, a TCEW 250 presented on or against a page of the ASMM through a series of surface selections. Although the placement of the TCEW 250 is the lower left-hand part of the ASMM, this is not a fixed location; instead, a manufacturer and/or end-user may configure the placement of the TCEW 250 (and/or any other TCEW discussed herein) as desired.

The TCEW 250 may be comprised of an airport-specific keyboard with visually-variable, interactive buttons. The interactive buttons include alphanumeric buttons indicating the taxiway and runway surfaces. The "TRMC" button indicates of the tarmac surface. The "@" button may be selected where a midfield take-off is instructed in the taxi clearance; for example, an aircraft cleared to "Runway 9 at Alpha" could be entered by the pilot selecting the 9, @, and A buttons sequentially. The "II" and "=" buttons may be selected where a "cross" and "hold short" instructions are provided, respectively. The "BACK" and "FWD" buttons may be selected to, for example, modify or correct the taxi clearance, and the "Enter" button may be used when the end of the clearance has been reached.

It should be noted that other non-taxiway and non-runway surfaces could be included as additional interactive buttons on the TCEW 250 if such surfaces are part of the airport. For the purpose of illustration and not of limitation, additional buttons indicative of passenger gate(s) and/or maintenance pad(s) could be used when an after-landing taxi clearance is issued to pilots and/or a taxi-for-maintenance clearance is issued to maintenance personnel taxiing ownship, respectively.

The use of the TCEW 250 could provide an additional and/or alternative method to the methods for the electronic recording of taxi clearances disclosed by Shapiro; moreover, more than one of the electronic recording methods disclosed herein or by Shapiro may be interchangeably swapped with one another as the taxi clearance is being received and/or recorded.

As shown in FIG. 4B, the keyboard is presented on or against a page of the ASMM. As observed by the cross-hatched fill, the visual appearance of all of the buttons except for the numeric buttons has been altered to signify a deactivation of those buttons. Here, the pilot will be unable to select a deactivated button; instead, he or she may select only the numeric buttons to begin a manual entry of the taxi clearance.

Using the same exemplary clearance that was discussed above, the pilot may tap the "22" button (item 252 shown in FIG. 4B) when "Runway 22" is provided to begin the clearance. Because of the selection, the visual appearance of the keyboard changes as shown in FIG. 4C. Because the manufacturer and/or end-user has configured to the ASMM to change graphically and/or textually as the taxi clearance is entered, visual changes to the surfaces shown in the ASMM will result with each tapping of a key in the same manner discussed in detail above; however, these changes will not be specifically acknowledged in the following discussion. Because the textual presentation of the taxi route will be obscured by the keyboard in the following discussion, it will not be presented even though additions to the text may occur as the taxi clearance is being received.

As shown by the visual appearances of the buttons in FIG. 4C, all of the buttons have been deactivated except for the following buttons: A, B, C, F, 9, 27, @, and Back. The A, F, 9, and 27 buttons represent those surfaces which intersect with Runway 22 from which a midfield takeoff may be performed; however, if there is an insufficient distance to perform a takeoff (as determined, for instance, by the FMS), some of these buttons could be deactivated automatically. The A, B, and C buttons represent the taxiways intersecting the Tarmac, the surface on which ownship currently is located. The @ button represents the possibility that the clearance may state a midfield takeoff instruction; if so, the tapping of the @ button may deactivate the B and C buttons because Taxiway B does not intersect Runway 22 at a midfield position and Taxiway C does not intersect Runway 22. The "Back" button represents the pilot's ability to change previous selections and will remain active in the following discussion (although not specifically acknowledged).

As the clearance continues and "Alpha" has been provided in sequence, the pilot may select this taxiway by tapping on the "A" button (item 254) as shown in FIG. 4D. Because of the selection, the visual appearance of the keyboard changes as shown in FIG. 4E. As shown by the visual appearances, all of the buttons have been deactivated except for the following buttons: D, E, F, G, 4, 8, 9, 22, 26, and 27. These buttons represent those surfaces which intersect with Taxiway A.

As the clearance continues and "Foxtrot" has been provided in sequence, the pilot may select this taxiway by tapping on the "F" button (item 256) as shown in FIG. 4F. Because of the selection, the visual appearance of the keyboard changes as shown in FIG. 4G. As shown by the visual appearances, all of the buttons have been deactivated except for the following buttons: B, D, E, J, 4, 9, and 22. These buttons represent those surfaces which intersect with Taxiway F.

As the clearance continues and "Juliet" has been provided in sequence, the pilot may select this taxiway by tapping on the "J" button (item 258) as shown in FIG. 4H. Because of the selection, the visual appearance of the keyboard changes as shown in FIG. 4I. As shown by the visual appearances, all of the buttons have been deactivated except for the following buttons: H and 27. These buttons represent those surfaces which intersect with Taxiway J.

As the clearance continues and "Hotel" has been provided in sequence, the pilot may select this taxiway by tapping on the "H" button (item 260) as shown in FIG. 4J. Because of the selection, the visual appearance of the keyboard changes as shown in FIG. 4K. As shown by the visual appearances, all of the buttons have been deactivated except for the following buttons: 8, 26, Cross, and Hold Short. The activation of these Cross and Hold Short buttons could have been triggered because a taxiway intersects with the assigned departure surface, where this taxiway represents the final taxiway stated in the taxi clearance. The activation of the Cross and Hold Short buttons represent an occasion in which there is an intersection between a stated taxiway (here, Taxiway A) and a runway (herein, Runway 8-26) other than the assigned departure runway (here, Runway 22).

As the clearance continues and "cross Runway 26" has been provided in sequence, the pilot may select this instruction by tapping the "26" button (item 262) followed by the "Cross" button (item 264) as shown in FIG. 4L. Because of the selection, the visual appearance of the keyboard changes as shown in FIG. 4M. As shown by the visual appearances, all of the buttons have been deactivated except for the following buttons: 9, 27, Cross, and Hold Short. As stated in the previous paragraph, the activation of these Cross and Hold Short buttons could have been triggered because a taxiway intersects with the assigned departure surface, where this taxiway represents the final taxiway stated in the taxi clearance. The activation of the Cross and Hold Short buttons represent a second occasion in which there is an intersection between a stated taxiway (here, Taxiway J) and a runway (herein, Runway 9-27) other than the assigned departure runway (here, Runway 22).

As the clearance continues and "hold short of Runway 27" has been provided in sequence, the pilot may select this instruction by tapping the "27" button (item 266) followed by the "Hold Short" button (item 268) as shown in FIG. 4N. Because of the selection, the visual appearance of the keyboard changes as shown in FIG. 4O. As shown by the visual appearances, all of the buttons have been deactivated except for the following button: Enter. The activation of the Enter button could have been triggered because (1) a taxiway intersects with the assigned departure surface, where this taxiway represents the final taxiway stated in the taxi clearance, and (2) there are no taxiway/runway intersections that need to be addressed.

Because the end of the clearance has been reached, the pilot may select this instruction by tapping the "Enter" button (item 270) as shown in FIG. 4P. Because of the selection, the TCEW is removed from view as shown in FIG. 4Q, leaving the ASMM indicative of the cumulative graphical and/or textual changes made through the sequence of selections discussed in the preceding paragraphs. As stated above, the textual presentation could aid the pilot during a read-back of the clearance. As stated above, after the entry of the taxi clearance has been completed, a runway highlighter and/or taxi direction indicators could be presented as disclosed by Shapiro to indicate the direction of the taxi.

Figure 5A:
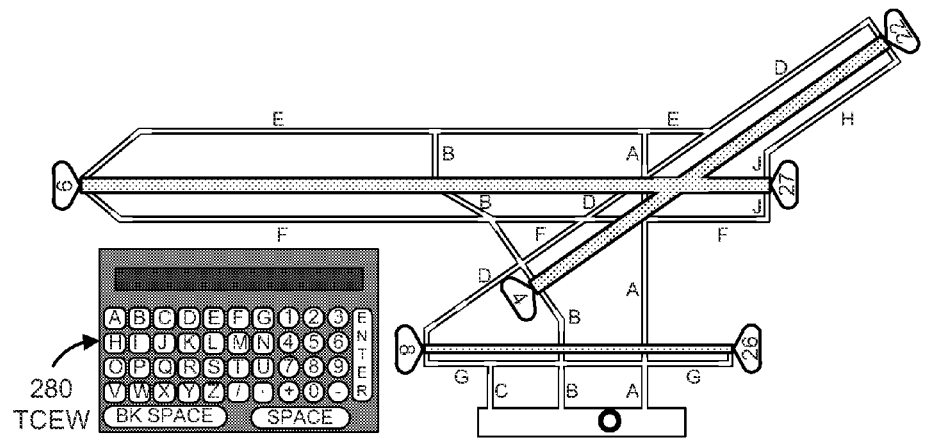
FIG. 5A illustrates a TCEW comprised of a second keyboard.

Additional advantages and benefits of the embodiments discussed herein may be illustrated in FIG. 5A-5I by demonstrating a method by which a taxi clearance may be recorded electronically through, as shown in FIG. 5A, a TCEW 280 presented on or against a page of the ASMM through a series of surface selections.

The TCEW 280 may be comprised of a generic keyboard with or without visually-variable, interactive buttons. The TCEW 280 may replicate a classic (or traditional) keyboard physically installed in aircraft which provide tactile buttons and a physical window referred to as a "scratchpad." Those skilled in the art understand that the layout of keyboard buttons vary widely between manufacturers; as such, the configuration of the keyboard shown in FIGS. 5A-5P is intended to be a generic representation only in order to illustrate how a classic layout of a keyboard may be used for the manual entry of a taxi clearance.

The use of the TCEW 280 could provide an additional and/or alternative method to the methods for the electronic recording of taxi clearances disclosed by Shapiro; moreover, more than one of the electronic recording methods disclosed herein or by Shapiro may be interchangeably swapped with one another as the taxi clearance is being received and/or recorded.

Figure 5B:
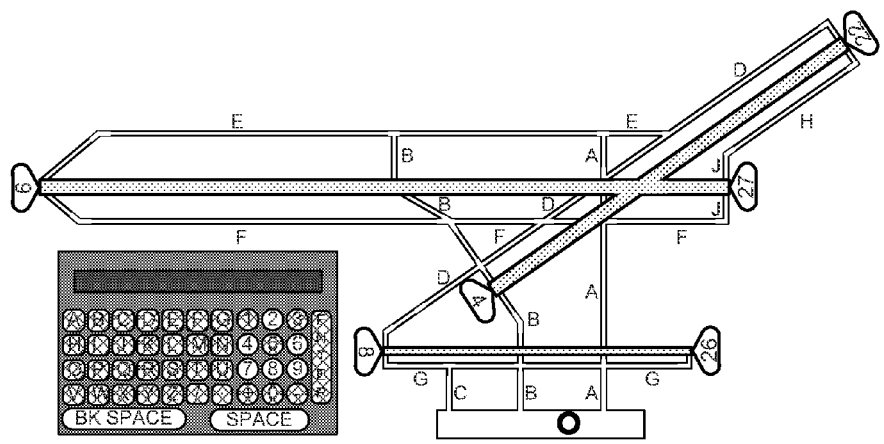
FIG. 5B illustrates the second keyboard presented on an ASMM.

As shown in FIG. 5B, the keyboard is presented on or against a page of the ASMM. As observed by the cross-hatched fill on most of the buttons, the visual appearance of all of the buttons has been altered to signify a deactivation of those buttons; however, the following buttons are active: 2, 4, 6, 7, 8, 9, BK SPACE (Backspace), and SPACE. Here, the pilot will be unable to select a deactivated button; instead, he or she may select only the active buttons to begin a manual entry of the taxi clearance.

Using the same exemplary clearance that was discussed above, the pilot may tap the "2" button twice and the SPACE button once when the clearance "Runway 22" is provided to begin the clearance. Because of these selections, the visual appearance of the keyboard changes shown in FIG. 5C including the entry of "22_" in the scratchpad; for the purpose of illustration, the underscore represents a space. Because the manufacturer and/or end-user has configured the ASMM to change graphically and/or textually as the taxi clearance is entered, visual changes to the surfaces shown in the ASMM will result with each tapping of a key in the same manner discussed in detail above; however, these changes will not be specifically acknowledged in the following discussion. Because the textual presentation of the taxi route will be obscured by the keyboard in the following discussion, it will not be presented even though additions to the text may occur as the taxi clearance is being received.

Figure 5C:
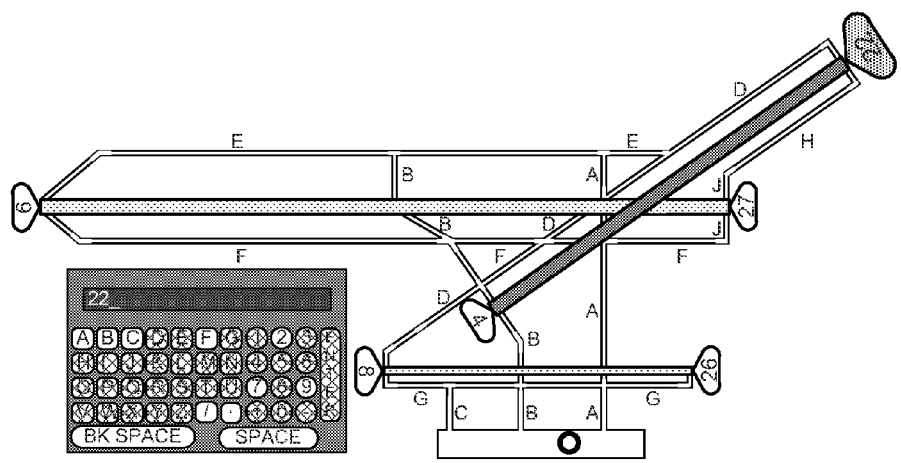
FIG. 5C illustrates visual appearances of activated and deactivated keyboard buttons on the second keyboard.

As shown by the visual appearances of the buttons in FIG. 5C, all of the buttons have been deactivated except for the following buttons: A, B, C, F, 2, 7, 9, -, and BK SPACE (Backspace). The A, F, 2, 7, and 9 buttons are the buttons from which to select one of the surfaces which intersect with Runway 22 from which a midfield takeoff may be performed. The A, B, and C buttons represent the taxiways intersecting the Tarmac, the surface on which ownship currently is located. The "-" button represents the possibility that the clearance may state a midfield takeoff instruction; if so, the tapping of the "-" button may deactivate the B and C buttons because Taxiways B and C do not intersect Runway 22. The "BK SPACE" button represents the pilot's ability to change previous selections and will remain active in the following discussion (although not specifically acknowledged).

Figure 5D:
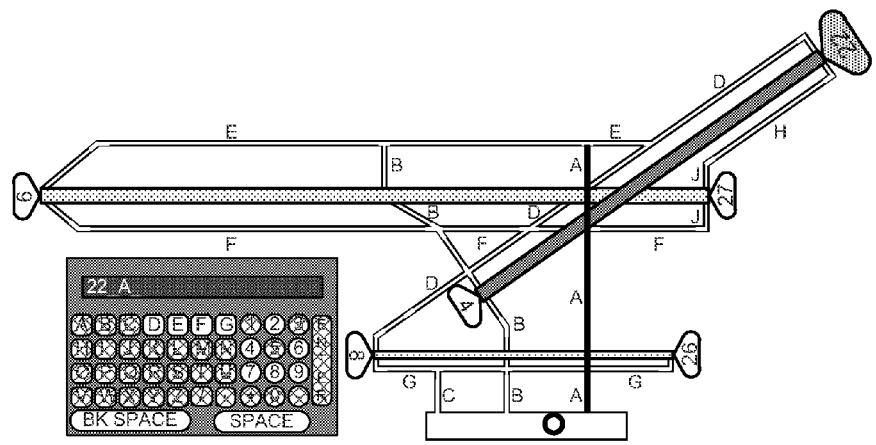
FIG. 5D illustrates second visual appearances of activated and deactivated keyboard buttons on the second keyboard.

As the clearance continues and "Alpha" has been provided in sequence, the pilot may select this taxiway by tapping on the "A" and SPACE buttons of FIG. 5C. Because of these selections, the visual appearance of the keyboard changes as shown in FIG. 5D including the entry of "22_A_" in the scratchpad. As shown by the visual appearances, all of the buttons have been deactivated except for the following buttons: D, E, F, G, 2, 4, 6, 7, 8, and 9. These are the buttons from which to select one of the surfaces which intersect with which intersect with Taxiway A.

Figure 5E:
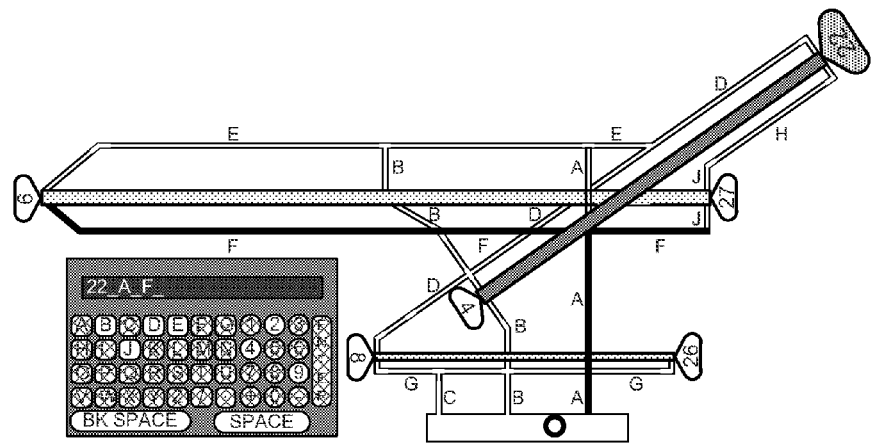
FIG. 5E illustrates third visual appearances of activated and deactivated keyboard buttons on the second keyboard.

As the clearance continues and "Foxtrot" has been provided in sequence, the pilot may select this taxiway by tapping on the "F" and SPACE buttons of FIG. 5D. Because of these selections, the visual appearance of the keyboard changes as shown in FIG. 5E including the entry of "22_A_F_" in the scratchpad. As shown by the visual appearances, all of the buttons have been deactivated except for the following buttons: B, D, E, J, 2, 4, and 9. These are the buttons from which to select one of the surfaces which intersect with Taxiway F.

Figure 5F:
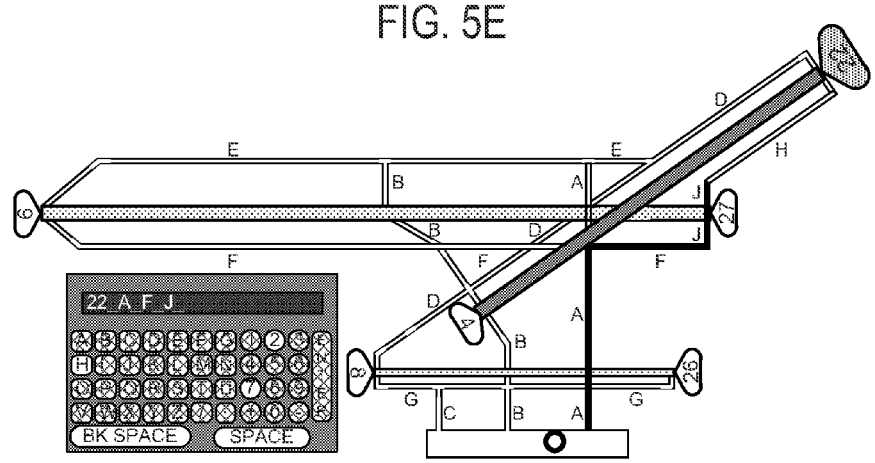
FIG. 5F illustrates fourth visual appearances of activated and deactivated keyboard buttons on the second keyboard.

As the clearance continues and "Juliet" has been provided in sequence, the pilot may select this taxiway by tapping on the "J" and SPACE buttons of FIG. 5E. Because of these selections, the visual appearance of the keyboard changes as shown in FIG. 5F including the entry of "22_A_F_J_" in the scratchpad. As shown by the visual appearances, all of the buttons have been deactivated except for the following buttons: H, 2, and 7. These buttons represent those surfaces which intersect with Taxiway J.

Figure 5G:
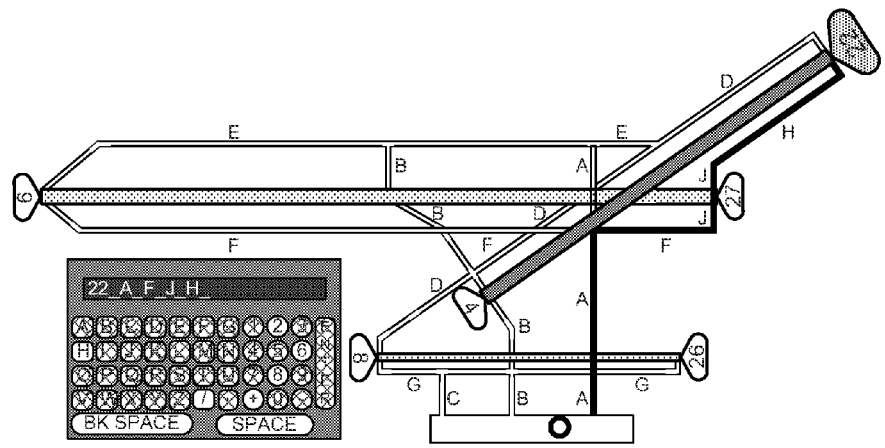
FIG. 5G illustrates fifth visual appearances of activated and deactivated keyboard buttons on the second keyboard.

As the clearance continues and "Hotel" has been provided in sequence, the pilot may select this taxiway by tapping on the "H" and SPACE buttons of FIG. 5F. Because of these selections, the visual appearance of the keyboard changes as shown in FIG. 5G including the entry of "22 AFJH" in the scratchpad. As shown by the visual appearances, all of the buttons have been deactivated except for the following buttons: 2, 6, 8, "+", and "l", where the "+" and "/" buttons represent Cross and Hold Short instructions that could have been triggered because a taxiway intersects with the assigned departure surface, where this taxiway represents the final taxiway stated in the taxi clearance. The activation of the "+" and "l" buttons represent an occasion in which there is an intersection between a stated taxiway (here, Taxiway A) and a runway (herein, Runway 8-26) other than the assigned departure runway (here, Runway 22). It should be noted that the activation of these buttons are not limited or exclusive to just this occasion.

Figure 5H:
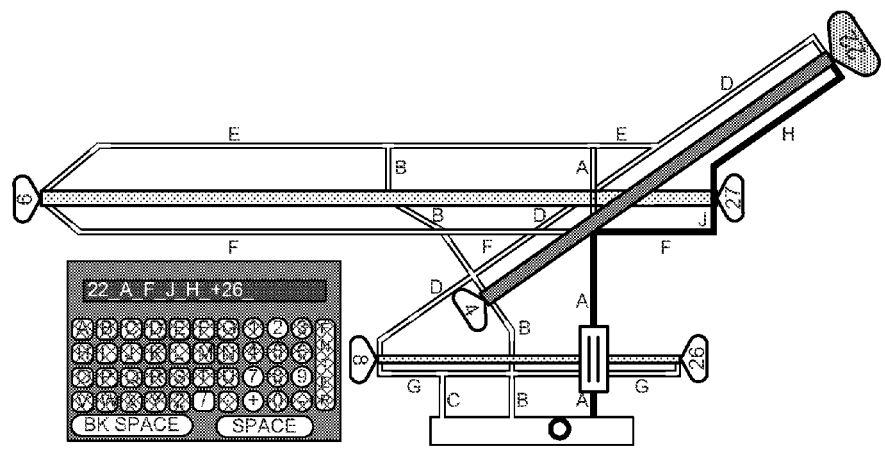
FIG. 5H illustrates sixth visual appearances of activated and deactivated keyboard buttons on the second keyboard.

As the clearance continues and "cross Runway 26" has been provided in sequence, the pilot may select this instruction by tapping the "+", "2", "6", and SPACE buttons of FIG. 5G. Because of these selections, the visual appearance of the keyboard changes as shown in FIG. 5H including the entry of 22"_A_F_J_H_+26" in the scratchpad. As shown by the visual appearances, all of the buttons have been deactivated except for the following buttons: 2, 7, 9, "+", and "/". As stated in the previous paragraph, the activation of these "+" and "l" buttons could have been triggered because a taxiway intersects with the assigned departure surface, where this taxiway represents the final taxiway stated in the taxi clearance. The activation of the "+" and "l" buttons represent a second occasion in which there is an intersection between a stated taxiway (here, Taxiway J) and a runway (herein, Runway 9-27) other than the assigned departure runway (here, Runway 22).

Figure 5I:
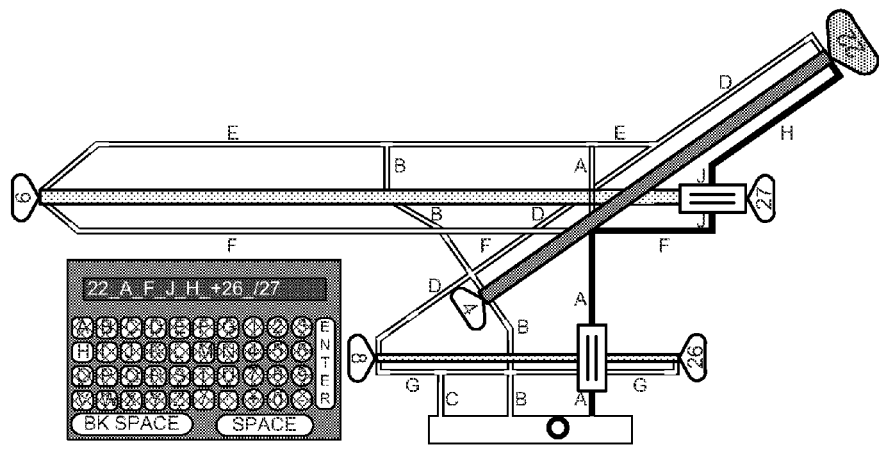
FIG. 5I illustrates seventh visual appearances of activated and deactivated keyboard buttons on the second keyboard.

As the clearance continues and "hold short of Runway 27" has been provided in sequence, the pilot may select this instruction by tapping the "/", "2", "7", and SPACE buttons of FIG. 5H. Because of these selections, the visual appearance of the keyboard changes as shown in FIG. 5I. As shown by the visual appearances, all of the buttons have been deactivated except for the following button: ENTER. The activation of the ENTER button could have been triggered because (1) a taxiway intersects with the assigned departure surface, where this taxiway represents the final taxiway stated in the taxi clearance, and (2) there are no taxiway/runway intersections that need to be addressed.

Because the end of the clearance has been reached, the pilot may select this instruction by tapping the "Enter" button of FIG. 5I. Because of the selection, the TCEW is removed from view, leaving the ASMM (as shown in FIG. 4Q) indicative of the cumulative graphical and/or textual changes made through the sequence of selections discussed in the preceding paragraphs. As stated above, the textual presentation could aid the pilot during a read-back of the clearance. As stated above, after the entry of the taxi clearance has been completed, a runway highlighter and/or taxi direction indicators could be presented as disclosed by Shapiro to indicate to the direction of the taxi.

Figure 6:
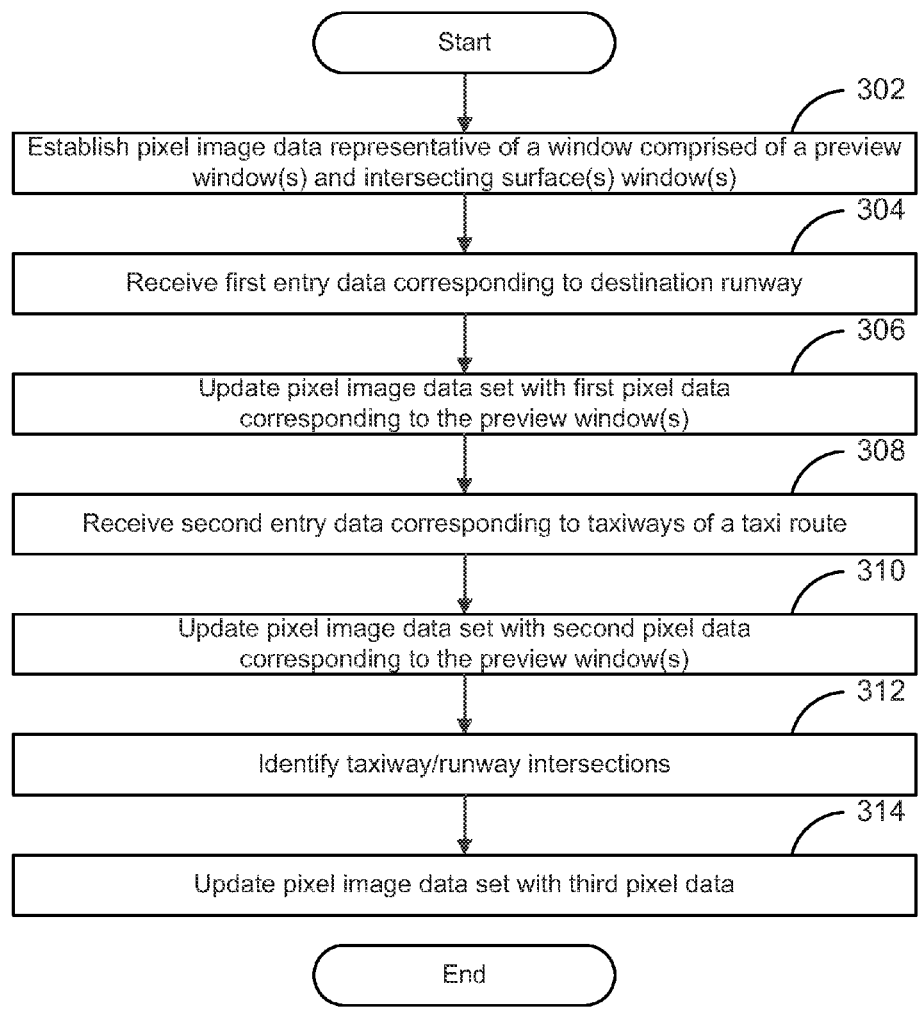
FIG. 6 provides a first flowchart illustrating a first method for electronically recording of a taxi clearance.
Figure 7:
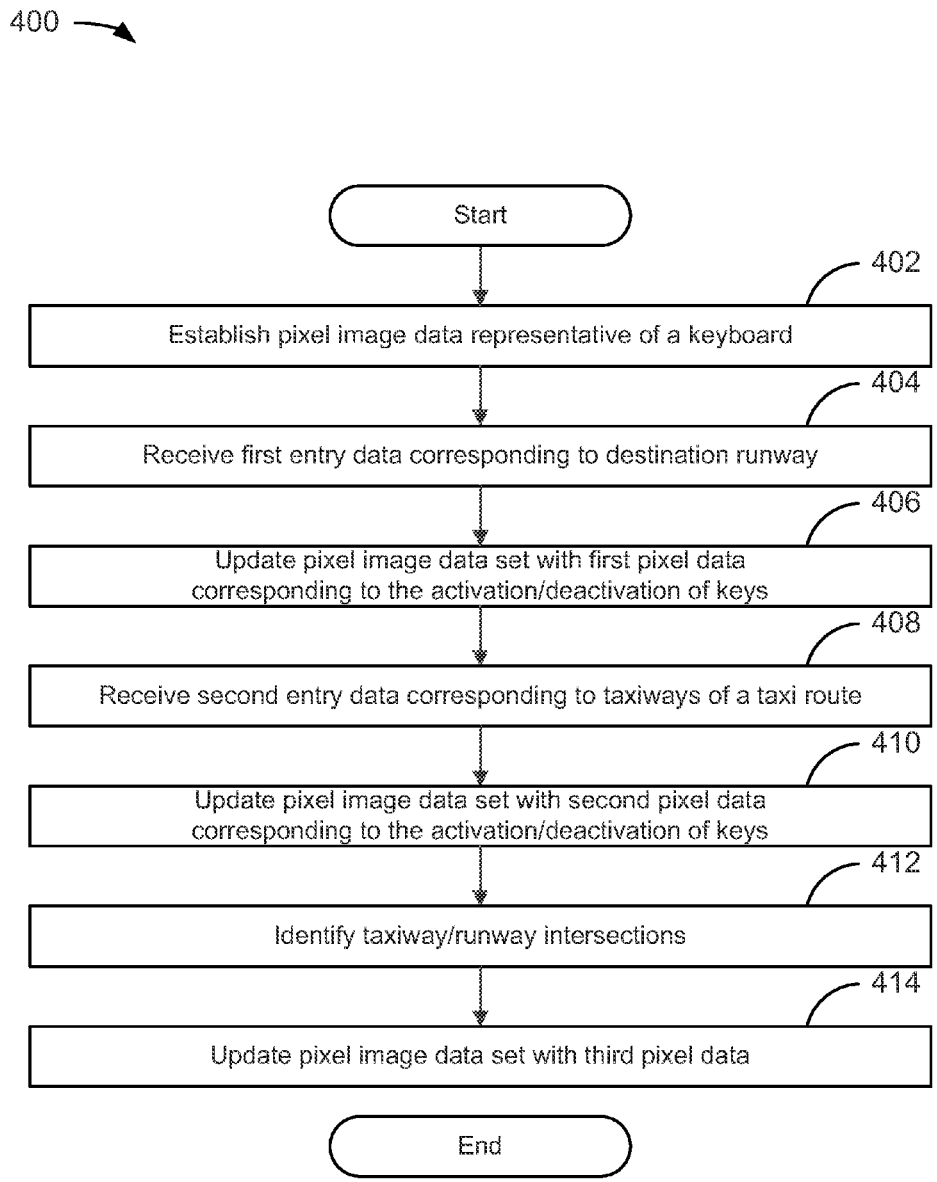
FIG. 7 provides a second flowchart illustrating a second method for electronically recording of a taxi clearance.
Figure 8:
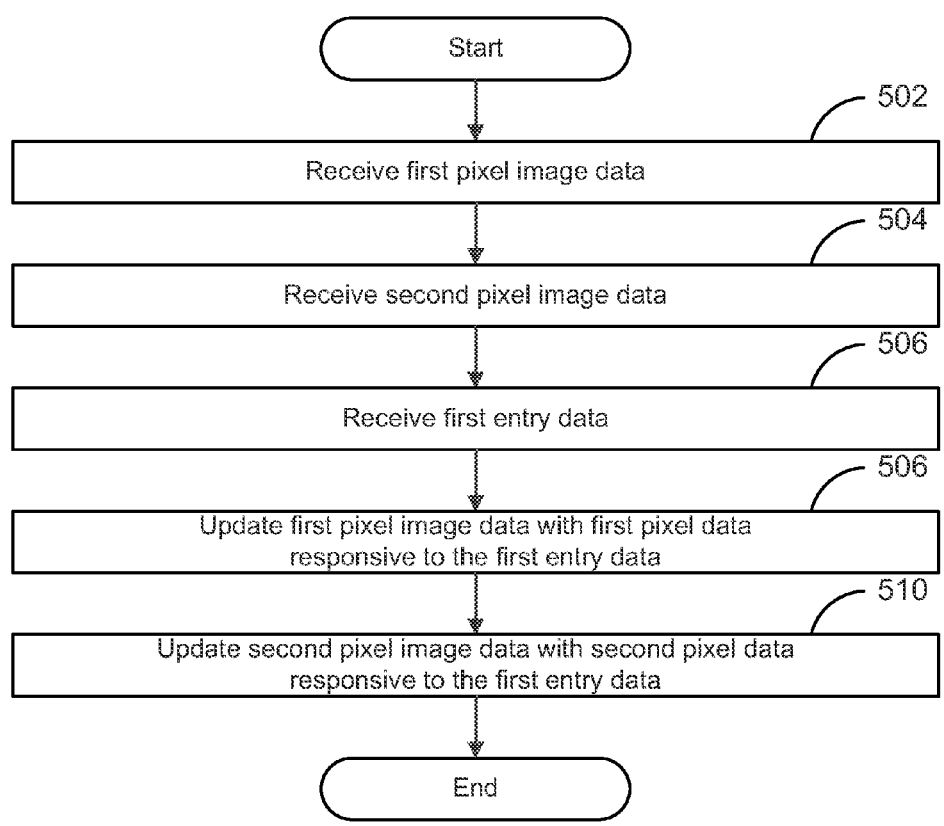
FIG. 8 provides a third flowchart illustrating a third method for electronically recording of a taxi clearance.

FIGS. 6 through 8 depict flowcharts 300 through 500, respectively, providing examples for electronically recording a taxi clearance on an airport surface map presented on a display unit, where the TPG 140 may be programmed or configured with instructions corresponding to the following modules. As embodied herein, the TPG 140 may be a processor of an indicating system comprising one or more display units. Also, the TPG 140 may be a processor of a module such as, but not limited to, a printed circuit card having one or more input interfaces to facilitate data communications with the TPG 140, i.e., the receiving and providing of data. As necessary for the accomplishment of the following modules embodied in FIGS. 6 through 8, the receiving of data is synonymous and/or interchangeable with the retrieval of data, and the providing of data is synonymous and/or interchangeable with the making available or supplying of data.

The method of flowchart 300 shown in FIG. 6 begins with module 302 with the establishing of pixel image data that is presented to a display unit configured to receive the pixel image data and present the image represented therein. The pixel image data may be representative of a taxi route entry window ("TREW"), where the TREW could be comprised of a first area and a second area; as embodied herein, the first and second areas could correspond to and/or be occupied by preview window(s) and intersecting surface(s) windows, respectively. One such example of a TREW is the TCEW disclosed above.

The method continues with module 304 with the receiving of first entry data through the pilot input device 110. The first entry data could represent an entry (i.e., selection) corresponding to the destination surface, where the destination surface may or may not have been specified in a taxi route; non-exhaustive examples of a destination surface include runway for takeoff, an assigned location on the airport including an arrival location for an aircraft that just landed, and/or a surface(s) created, developed, designed, and/or designated by the pilot. The entry could be comprised of the selection of one prospective destination surface appearing within the TREW among a plurality of prospective destination surfaces.

An example of a taxi route is the taxi clearance (or the route stated therein). As discussed and illustrated above, the taxi clearance could be comprised of one destination surface (e.g., an assigned runway for takeoff, an assigned ground location, etc. . . . ). The taxi clearance could be further comprised of one originating surface (e.g., an originating taxiway) selected from potential originating surface(s) and one terminating surface (e.g., a terminating taxiway); if only one surface is stated in the clearance, the originating surface and one terminating surface may be the same. If a runway is stated in the taxi clearance and is included as part of the taxi path to the assigned runway, then such a runway may be considered as a taxiway. If two or more surfaces are assigned, they may be assigned in sequence in the order which the aircraft is expected to follow. Each surface could have an originating end and a terminating end, and if there is a sequence of surfaces, the terminating end could be the originating end of the next surface in sequence. For the originating surface, the originating end could be fixed; for the terminating surface, the terminating end could be fixed and terminate at the destination surface.

The method continues with module 306 with the updating of the pixel image data with first pixel data. The first pixel data may be responsive to the first entry data of module 304 and representative of one or more prospective originating surfaces and one or more intersecting surfaces appearing within the preview and intersecting surface(s) windows of the TREW, respectively, where each prospective originating surface corresponds to one or more intersecting surfaces. As embodied herein, the prospective originating surface(s) could be based upon the position of ownship as determined from navigation data.

The method continues with module 308 with the receiving at least one second entry data through a pilot input device. The second entry data could represent one or more entries (i.e., selections), where each entry may correspond to selection of one intersecting surface appearing within the TREW.

The method continues with module 310 with the updating of the pixel image data with second pixel data in response to receiving each second entry data. For each second entry data received, the second pixel data could be representative of an additional surface and one or more additional intersecting surfaces appearing within respective windows of the TREW, where each additional surface corresponds to one or more intersecting surfaces. As embodied herein, the second pixel data may sequentially update the pixel image data as the second entry data is received sequentially.

The method continues with module 312 with the identifying of each intersection of a runway and taxiway occurring in a taxi path of a taxi clearance except for the stated terminating taxiway. The method continues with module 314 with the updating of the pixel image data with third pixel data in response to the identification of each intersection. The third pixel data could be representative of a cross instruction and/or hold short instruction. the method of flowchart 300 proceeds to the end.

The method of flowchart 400 shown in FIG. 7 begins with module 402 with the establishing of pixel image data that is presented to a display unit configured to receive the pixel image data and present the image represented therein. The pixel image data may be representative of a TREW, where the TREW could be comprised of a keyboard. In one embodiment, the keyboard could be comprised of an airport-specific keyboard with visually-variable, interactive buttons, where the quantity of keys appearing on the keyboard could be determined as a function of the number of surfaces identified in surface data retrieved from a navigation reference data and taxi clearance syntax as discussed above. In another embodiment, the layout of the keys on the keyboard could replicate a traditional aircraft keyboard physically installed and having tactile buttons.

The method continues with module 404 with the receiving of first entry data through the pilot input device 110. The first entry data could represent an entry (i.e., selection) corresponding to the destination surface that has been specified in a taxi route; non-exhaustive examples of a destination surface include runway for takeoff, an assigned location on the airport including an arrival location for an aircraft that just landed. The entry could be comprised of the selection of one prospective destination surface appearing within the TREW among a plurality of prospective destination surfaces; it should be noted that the entry could be a selection made from a traditional keyboard with tactile keys in addition to and/or alternative to the keyboard of the TREW. The taxi route could be the same route discussed above in module 304.

The method continues with module 406 with the updating of the pixel image data with first pixel data. The first pixel data may be responsive to the first entry data of module 402 and representative of one or more first activated keys and one or more first deactivated keys. All of the keys on the keyboard may be first deactivated keys except for the first activated key(s), where each first activated key may be comprised of a key required to enter one or more prospective originating surfaces and one or more intersecting surfaces, where each prospective originating surface may intersect one or more intersecting surfaces. Also, each first activated key may be visually distinguishable from each first deactivated key.

The method continues with module 408 with the receiving at least one second entry data through a pilot input device. The second entry data could represent one or more entries (i.e., selections), where each entry may correspond to selection of one intersecting surface.

The method continues with module 410 with the updating of the pixel image data with second pixel data in response to receiving each second entry data. For each second entry data received, the second pixel data could be representative of one or more second activated keys and one or more second deactivated keys. All of the keys on the keyboard may be second deactivated keys except for the second activated key(s), where each second activated key may be comprised of a key required to enter one or more additional intersecting surfaces. Also, each first activated key may be visually distinguishable from each first deactivated key. As embodied herein, the second pixel data may sequentially update the pixel image data as the second entry data is received sequentially.

The method continues with module 412 with the identifying of each intersection of a runway and taxiway occurring in the taxi path of a taxi clearance except for the stated terminating taxiway. The method continues with module 414 with the updating of the pixel image data with third pixel data in response to the identification of each intersection. The third pixel data could be representative of a cross instruction and/or hold short instruction. Then, the method of flowchart 400 proceeds to the end.

The method of flowchart 500 begins with module 502 with the establishing of first pixel image data that is presented to a display unit configured to receive the pixel image data and present the image represented therein. The first pixel image data may be representative of an image of airport surfaces and surface identifiers (e.g., directional surface identifiers) for runway surfaces and/or taxiway surfaces as disclosed in both Barber and Shapiro. The image could be formed from surface data retrieved from the navigation reference data source 130. The establishing of first pixel image data could include the generating of such pixel image data by techniques known to those skilled in the art. One technique could include the employment of the ARINC 661 protocol to, in part, control the use of widgets representative of airport surfaces and/or surface identifiers through the administration of widget parameters which affect the display of widgets and/or the pilot's ability to interact with the widgets. With ARINC 661, the image of airport surfaces and surface identifiers could be comprised of any combination of interactive and/or non-interactive widgets.

The method continues with module 504 with the establishing of second pixel image data that is presented to a display unit configured to receive the pixel image data and present the image represented therein. The second pixel image data may be representative of a TREW, where the TREW may be superimposed against the image of airport surfaces and surface identifiers for runway surfaces and/or taxiway surfaces of the first pixel image data. In one embodiment; the TCEW could be comprised of first and second areas discussed above in module 302. In another embodiment, the TCEW could be comprised of keyboard as discussed above in module 402.

The method continues with module 506 with the receiving of first entry data through the pilot input device 110. The first entry data could represent an entry (i.e., selection) corresponding to the destination surface that has been specified in a taxi route; non-exhaustive examples of a destination surface include runway for takeoff, an assigned location on the airport including an arrival location for an aircraft that just landed. The entry could be comprised of the selection of one prospective destination surface appearing within the TREW among a plurality of prospective destination surfaces. The taxi route could be the same route discussed above in module 304.

The method continues with module 508 with the updating of the first pixel image data with first pixel data in response to receiving the first entry data. The first pixel data may be responsive to the first entry data of module 506 above and represent a first highlighter for making the assigned runway appear conspicuous; the first pixel data could also include text corresponding to the assigned runway for a textual presentation of the taxi route along with the graphical presentation. These updates are disclosed in Shapiro. The first highlighter could change the appearance of the surface of the assigned runway and/or the runway indicator. Also, the first highlighter could be a runway highlighter comprised of a plurality of chevrons and a plurality of runway edge highlighters. Because the display unit is configured to receive the pixel image data and present the image represented therein, the image may change in response to each entry as the pixel image data is updated.

The method continues with module 510 with the updating of the second pixel image data with second pixel data in response to receiving the first entry data. In an embodiment in which the TREW is comprised of first and second areas, the second pixel data may be representative of one or more prospective originating surfaces and one or more intersecting surfaces appearing within the TREW, where each prospective originating surface intersects one or more intersecting surfaces.

In an embodiment in which the TREW is comprised of a keyboard, the second pixel data may be representative of one or more first activated keys and one or more first deactivated keys. All of the keys on the keyboard may be first deactivated keys except for the first activated key(s), where each first activated key may be comprised of a key required to enter one or more prospective originating surfaces and one or more intersecting surfaces, where each prospective originating surface may intersect one or more intersecting surfaces. Also, each first activated key may be visually distinguishable from each first deactivated key.

In an additional embodiment in which the TREW is comprised of first and second areas, second entry data could represent one or more entries (i.e., selections) received through a pilot input device, where each entry may correspond to selection of one intersecting surface appearing within the TREW. Then, first pixel image data may be updated with third pixel data in response to receiving of each second entry data. The third pixel data may be representative of a second highlighter corresponding to the entry of one intersecting surface, where the intersecting surface is highlighted in between its originating end and its terminating end. Then, the second image data may be updated with fourth pixel data in response to receiving of each second entry data. The fourth pixel data may be representative of an additional surface specified in the taxi route and one or more additional intersecting surfaces appearing within the TREW. As embodied herein, the third pixel data and the fourth pixel data may sequentially update the first pixel image data and the second pixel image data, respectively, as the second entry data is received sequentially. Also, the image of airport surfaces may be panned and zoomed, as necessary, in response to receiving each second entry data as disclosed above.

In an additional embodiment in which the TREW is comprised of a keyboard, second entry data could represent one or more entries (i.e., selections) received through a pilot input device, where each entry may correspond to selection of one intersecting surface. Then, first pixel image data may be updated with third pixel data in response to receiving of each second entry data. The third pixel data may be representative of a second highlighter corresponding to the entry of one intersecting surface, where the intersecting surface is highlighted in between its originating end and its terminating end. Then, the second image data may be updated with fourth pixel data in response to receiving of each second entry data. The fourth pixel data may be representative of one or more second activated keys and one or more second deactivated keys. All of the keys on the keyboard may be second deactivated keys except for the second activated key(s), where each second activated key may be comprised of a key required to enter at least one intersecting surface and each second activated key is visually distinguishable from each second deactivated key. As embodied herein, the third pixel data and the fourth pixel data may sequentially update the first pixel image data and the second pixel image data, respectively, as the second entry data is received sequentially. Also, the image of airport surfaces may be panned and zoomed, as necessary, in response to receiving each second entry data as disclosed above. Then, the method of flowchart 500 proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method for electronically recording an aircraft taxi clearance with a display unit, comprising:

generating, by an image generator including at least one processor coupled to a non-transitory processor-readable medium storing processor-executable code, pixel image data representative of a first image data set comprised of at least one first preview image independent of an ownship's heading and location on a surface at an airport having a plurality of surfaces, where each first preview image excludes all of the plurality of surfaces except for one image of one first surface depicted graphically and with an alphanumeric identifier;

receiving, via a pilot input device, initial surface data representative of one selection of one first preview image presenting one surface specified in an aircraft taxi clearance as a destination surface, where the aircraft taxi clearance further specifies one originating surface different from the surface on which ownship is located and one terminating surface different from the one originating surface and the one destination surface;

modifying the pixel image data in response to receiving the initial surface data to create a second image data set based upon ownship's location and comprised of at least one second preview image and at least one next intersection image, wherein each second preview image excludes all of the plurality of surfaces except for one image of one second surface depicted graphically and with an alphanumeric identifier, where the one second surface intersects the surface on which ownship is located, and each next intersection image presents one surface intersecting the one originating surface;

receiving final surface data representative of one selection of one next intersection image presenting the one terminating surface;

modifying the pixel image data to create a third image data set comprised of an entry-completion image; and receiving entry-completing data representative of a selection of the entry-completion image, thereby completing the electronic recording of the aircraft taxi clearance.

2. The method of claim 1, wherein at least one of the one image of one first surface and the one image of one second surface includes at least one surface intersecting the one first surface and at least one surface intersecting the one second surface, respectively.

3. The method of claim 1, wherein the one destination surface is a runway assigned for takeoff, an arrival location on the airport, or a location defined by a pilot.

4. The method of claim 1, wherein each next intersection image is presented as a button with an alphanumeric label identifying the next intersection.

5. The method of claim 1, wherein at least one of a plurality of first preview images, a plurality of second preview images, a plurality of next intersection images, and an entry-completion image are presented in an image of a taxi clearance entry window.

6. The method of claim 5, wherein the image of the taxi clearance entry window is presented as an overlay against an image of a taxi route entry window within which all of the plurality of surfaces of the airport are presented.

7. The method of claim 6, wherein each one of the plurality of surfaces of the airport appearing in the taxi route entry window is depicted graphically and with an alphanumeric identifier, the graphical depiction of the destination surface appearing in the taxi route entry window is highlighted in response to the initial surface data being received, and the graphical depictions of both the originating surface and the terminating surface appearing in the taxi route entry window are highlighted in response to the final surface data being received.

8. The method of claim 1, wherein the aircraft taxi clearance also specifies at least one cross/hold short instruction, and the method of claim 1 further comprises:

modifying, after the final surface data is received and prior to the modification of the pixel image data creating the third image data set, the pixel image data to create at least one fourth image data set and, in response to the creation of each fourth image data set, receiving cross/hold short data, wherein each fourth image data set is comprised of a third preview image, wherein the third preview image excludes all of the plurality of surfaces except for one image of intersecting surfaces being subjected to one cross/hold short instruction, and depicted graphically and with an alphanumeric identifier, and the cross/hold short data is representative of a selection corresponding to the cross/hold short instruction.

9. The method of claim 8, wherein the selection corresponding to the cross/hold short instruction is made by selecting an image presented as a button with a label indicative of either cross or hold short instruction.

10. The method of claim 1, wherein the at least one next intersection image is at least one first next intersection image, the each next intersection image is each first next intersection image, the one selection of one next intersection image is one selection of one second next intersection image, the aircraft taxi clearance also specifies at least one intermediate surface in between the one originating surface and the one terminating surface, and the method of claim 1 further comprises:

receiving, prior to the final surface data being received, at least one intermediate surface data and, in response to each intermediate surface data being received, modifying the pixel image data to create a fourth image data set, wherein each intermediate surface data is representative of one selection of one first next intersection image presenting one intermediate surface specified in the aircraft taxi clearance, and the fourth image data set is comprised of at least one third preview image and at least one third next intersection image, wherein each third preview image excludes all of the plurality of surfaces except for one image of one third surface depicted graphically and with an alphanumeric identifier, and each third next intersection image presents one surface intersecting the one intermediate surface specified in the aircraft taxi clearance.

11. The method of claim 10, wherein at least one of the one image of one first surface, the one image of one second surface, and the one image of one third surface includes at least one surface intersecting the one first surface, at least one surface intersecting the one second surface, and at least one surface intersecting the one third surface, respectively.

12. The method of claim 10, wherein at least one of a plurality of first preview images, a plurality of second preview images, a plurality of third preview images, a plurality of next intersection images, and an entry-completion image are presented in an image of a taxi clearance entry window.

13. The method of claim 12, wherein the image of the taxi clearance entry window is presented as an overlay against an image of a taxi route entry window within which all of the plurality of surfaces of the airport are presented.

14. The method of claim 13, wherein each one of the plurality of surfaces of the airport appearing in the taxi route entry window is depicted graphically and with an alphanumeric identifier, the graphical depiction of the destination surface appearing in the taxi route entry window is highlighted in response to the initial surface data being received, and the graphical depictions of both the originating surface and a first intermediate surface are highlighted in response to initial intermediate surface data being received, and the graphical depiction of the terminating surface appearing in the taxi route entry window is highlighted in response to the final surface data being received.

15. The method of claim 10, wherein
the aircraft taxi clearance also specifies at least one cross/hold short instruction, and
the method of claim 9 further comprises:
modifying, after the final surface data is received and prior to the modification of the pixel image data creating the third image data set, the pixel image data to create at least one fifth image data set and, in response to the creation of each fifth image data set, receiving cross/hold short data, wherein
each fifth image data set is comprised of a fourth preview image, wherein
the fourth preview image excludes all of the plurality of surfaces except for one image of intersecting surfaces being subjected to one cross/hold short instruction, and depicted graphically and with an alphanumeric identifier, and
the cross/hold short data is representative of a selection corresponding to the cross/hold short instruction.

16. A method for electronically recording an aircraft taxi clearance with a display unit, comprising:
generating, by an image generator including at least one processor coupled to a non-transitory processor-readable medium storing processor-executable code, pixel image data representative of a first image data set comprised of a keyboard image having a plurality of key images that are either activated key images or deactivated key images, where
both the activated key images and the deactivated keys are visible to a pilot,
the activated key images are visually distinguishable from the deactivated keys, and
the plurality of key images is comprised of a plurality of airport-specific key images and an entry-completion key image, where
each one of the airport-specific key images is assigned to one surface of a plurality of surfaces at an airport, and
the entry-completion key image is employed to complete the electronic recording of the aircraft taxi clearance;
receiving, via a pilot input device, initial surface data representative of one selection of one airport-specific key image assigned to one surface specified in an aircraft taxi clearance as a destination surface, where
the aircraft taxi clearance further specifies one originating surface different from a surface on which ownship is located and one terminating surface different from the one originating surface and the one destination surface;
modifying the pixel image data in response to receiving the initial surface data to create a second image data set based upon ownship's location, wherein
the second image data set is comprised of the keyboard image in which each one of the plurality of key images becomes a deactivated key image except for at least one airport-specific key image assigned to a surface intersecting the originating surface;
receiving final surface data representative of one selection of one airport-specific key image assigned to the one terminating surface;
modifying the pixel image data to create a third image data set, wherein
the third image data set is comprised of the keyboard image in which each one of the plurality of key images becomes a deactivated key image except for the entry-completion key image; and
receiving entry-completing data representative of a selection of the entry-completion key image, thereby completing the electronic recording of the aircraft taxi clearance.

17. The method of claim 16, wherein the one destination surface is a runway assigned for takeoff, an arrival location on the airport, or a location defined by a pilot.

18. The method of claim 16, wherein the keyboard image is presented as an overlay against an image of a taxi route entry window within which all of the plurality of surfaces of the airport are presented.

19. The method of claim 18, wherein
each one of the plurality of surfaces of the airport appearing in the taxi route entry window is depicted graphically and with an alphanumeric identifier,
the graphical depiction of the destination surface appearing in the taxi route entry window is highlighted in response to the initial surface data being received, and
the graphical depictions of both the originating surface and the terminating surface appearing in the taxi route entry window are highlighted in response to the final surface data being received.

20. The method of claim 16, wherein
the aircraft taxi clearance also specifies at least one cross/hold short instruction,
the plurality of key images is further comprised of two clearance-instruction keys images assigned to a cross surface instruction and a hold short instructions of an aircraft taxi clearance, and
the method of claim 14 further comprises:
modifying, after the final surface data is received and prior to the modification of the pixel image data creating the third image data set, the pixel image data to create at least one fourth image data set and, in response to the creation of each fourth image data set, receiving cross/hold short data, wherein
each fourth image data set is comprised of the keyboard image in which each one of the plurality of key images becomes a deactivated key image except for at least one airport-specific key image assigned to a surface being subjected to one cross/hold short instruction and the two clearance-instruction key images, and
the cross/hold short data is representative of selections corresponding to the cross/hold short instruction.

21. The method of claim 20, wherein the selections corresponding to the cross/hold short instruction includes selecting one clearance-instruction key image presented as a button with a label indicative of either cross or hold short instruction.

22. The method of claim 16, wherein
the aircraft taxi clearance also specifies at least one intermediate surface in between the one originating surface and the one terminating surface, and
the method of claim 14 further comprises:
receiving, prior to the final surface data being received, at least one intermediate surface data and, in response to each intermediate surface data being received, modifying the pixel image data to create a fourth image data set, wherein each intermediate surface data is representative of one selection of one airport-specific key image assigned to one intermediate surface specified in the aircraft taxi clearance, and the fourth image data set is comprised of the keyboard image in which each one of the plurality of key images becomes a deactivated key image expect for at least one key image assigned to one surface intersecting the one intermediate surface specified in the aircraft taxi clearance.

23. The method of claim 22, wherein
the aircraft taxi clearance also specifies at least one cross/hold short instruction,
the plurality of key images is further comprised of two clearance-instruction keys images assigned to a cross surface instruction and a hold short instructions of an aircraft taxi clearance, and
the method of claim 14 further comprises:
modifying, after the final surface data is received and prior to the modification of the pixel image data creating the third image data set, the pixel image data to create at least one fifth image data set and, in response to the creation of each fifth image data set, receiving cross/hold short data, wherein
each fifth image data set is comprised of the keyboard image in which each one of the plurality of key images becomes a deactivated key image except for at least one airport-specific key image assigned to a surface being subjected to one cross/hold short instruction and the two clearance-instruction key images, and
the cross/hold short data is representative of selections corresponding to the cross/hold short instruction.

24. The method of claim 22, wherein the keyboard image is presented as an overlay against an image of a taxi route entry window within which all of the plurality of surfaces of the airport are presented.

25. The method of claim 24, wherein
each one of the plurality of surfaces of the airport appearing in the taxi route entry window is depicted graphically and with an alphanumeric identifier,
the graphical depiction of the destination surface appearing in the taxi route entry window is highlighted in response to the initial surface data being received, and
the graphical depictions of both the originating surface and a first intermediate surface are highlighted in response to initial intermediate surface data being received, and
the graphical depiction of the terminating surface appearing in the taxi route entry window is highlighted in response to the final surface data being received.

* * * * *